(12) United States Patent
Jonsson et al.

(10) Patent No.: US 12,532,395 B2
(45) Date of Patent: Jan. 20, 2026

(54) RESISTOR MAPPING FOR DEVICE PROFILES

(71) Applicant: Amatis Controls LLC, Grand Rapids, MI (US)

(72) Inventors: Karl S. Jonsson, Rancho Santa Margarita, CA (US); Miles A Hill, Boulder, CO (US)

( * ) Notice: Subject to any disclaimer, the term of this patent is extended or adjusted under 35 U.S.C. 154(b) by 0 days.

(21) Appl. No.: 19/052,905

(22) Filed: Feb. 13, 2025

(65) Prior Publication Data

US 2025/0185146 A1    Jun. 5, 2025

Related U.S. Application Data

(63) Continuation of application No. PCT/US2024/010797, filed on Jan. 9, 2024.

(60) Provisional application No. 63/512,495, filed on Jul. 7, 2023.

(51) Int. Cl.
*H05B 47/185* (2020.01)
*H04L 12/10* (2006.01)

(52) U.S. Cl.
CPC .......... *H05B 47/187* (2024.01); *H04L 12/10* (2013.01)

(58) Field of Classification Search
None
See application file for complete search history.

(56) References Cited

U.S. PATENT DOCUMENTS

| | | |
|---|---|---|
| 7,038,399 B2 | 5/2006 | Lys et al. |
| 7,233,115 B2 | 6/2007 | Lys |

(Continued)

FOREIGN PATENT DOCUMENTS

| | | |
|---|---|---|
| WO | 2011055284 A2 | 5/2011 |
| WO | 2011055284 A9 | 1/2012 |
| WO | 2020198094 A1 | 10/2020 |

OTHER PUBLICATIONS

"Part 3: Carrier Sense Multiple Access With Collision Dection (CSMA/CD) Access Method and Physical Layer Specifications Amendment: Data Terminal Equipment (DTW) Power View Media Deependent Interface (MDI)", IEEE STE 802.3AF-2003, Jun. 18, 2003, p. 1-131.

(Continued)

*Primary Examiner* — Srinivas Sathiraju
(74) *Attorney, Agent, or Firm* — Youngs Patent Services; Bruce A. Young

(57) ABSTRACT

A power sourcing device measures a resistance between the "A" pairs of an Ethernet cable to determine a first signature resistance value and uses the first signature resistance value to determine whether the device is able to receive power over the Ethernet cable in a manner compliant with the IEEE Power over Ethernet standard. In response to determining that the device can receive power over the Ethernet cable compliant with the standard, the power sourcing device provides power to the device over the Ethernet cable as specified by the standard. In response to determining that the device is not able to receive power over the Ethernet cable as specified by the standard, the power sourcing device uses the first signature resistance to determine a power request for the device and then provides a power signal over the Ethernet cable to the device that is consistent with the power request.

18 Claims, 9 Drawing Sheets

(56) References Cited

U.S. PATENT DOCUMENTS

| | | | |
|---|---|---|---|
| 7,843,670 B2* | 11/2010 | Blaha | H04L 12/10 361/18 |
| 8,398,253 B2 | 3/2013 | Sivertsen | |
| 8,558,413 B1 | 10/2013 | Lepard | |
| 8,975,825 B2 | 3/2015 | Hu | |
| 9,101,032 B2 | 8/2015 | Kim et al. | |
| 9,155,171 B1* | 10/2015 | Hughes | H05B 47/187 |
| 9,209,981 B2* | 12/2015 | Heath | H04L 12/10 |
| 9,295,142 B1 | 3/2016 | Leinen et al. | |
| 9,338,860 B2 | 5/2016 | Radermacher | |
| 9,596,727 B2* | 3/2017 | Leinen | H05B 45/382 |
| 9,644,828 B1* | 5/2017 | May | F21V 3/00 |
| 9,671,071 B1* | 6/2017 | May | F21S 8/04 |
| 9,671,072 B1* | 6/2017 | May | F21V 19/008 |
| 9,726,331 B1* | 8/2017 | May | F21K 9/278 |
| 9,726,332 B1* | 8/2017 | May | F21K 9/275 |
| 9,726,361 B1* | 8/2017 | May | F21V 7/00 |
| 9,739,427 B1* | 8/2017 | May | F21V 23/02 |
| 9,769,909 B2* | 9/2017 | Gershowitz | H05B 45/10 |
| 9,927,073 B2* | 3/2018 | May | H05B 47/19 |
| 10,051,715 B2* | 8/2018 | Hick | H04L 12/10 |
| 10,119,661 B2* | 11/2018 | May | F21K 9/278 |
| 10,161,605 B2* | 12/2018 | May | F21S 9/022 |
| 10,314,141 B2 | 6/2019 | Harvey et al. | |
| 10,361,583 B2* | 7/2019 | Crenshaw | H05B 45/3725 |
| 10,495,267 B2* | 12/2019 | May | F21V 21/005 |
| 10,587,116 B2* | 3/2020 | Long | H02J 7/0029 |
| 10,609,797 B1 | 3/2020 | Jonsson | |
| 10,757,791 B1 | 8/2020 | Jonsson | |
| 10,851,974 B2* | 12/2020 | May | F21V 23/02 |
| 10,865,965 B2* | 12/2020 | May | F21V 23/009 |
| 10,941,908 B2* | 3/2021 | May | F21K 9/66 |
| 10,948,136 B2* | 3/2021 | May | F21K 9/272 |
| 11,067,258 B2* | 7/2021 | May | F21V 23/06 |
| 11,108,230 B2* | 8/2021 | Long | H02J 1/082 |
| 11,162,667 B2* | 11/2021 | May | F21S 4/28 |
| 11,258,366 B2* | 2/2022 | Long | H02M 3/04 |
| 11,355,928 B2* | 6/2022 | Long | H02J 7/0029 |
| 11,444,791 B2* | 9/2022 | Jones | H04W 80/02 |
| 11,713,853 B2* | 8/2023 | May | F21V 23/02 362/218 |
| 11,949,522 B2* | 4/2024 | Tian | H04L 12/40045 |
| 2006/0164108 A1 | 7/2006 | Herbold | |
| 2006/0168458 A1 | 7/2006 | Stineman et al. | |
| 2006/0263925 A1* | 11/2006 | Chandler | G01N 35/00871 438/61 |
| 2008/0052546 A1* | 2/2008 | Schindler | H04L 12/40045 713/300 |
| 2008/0080105 A1* | 4/2008 | Blaha | H04L 12/10 361/38 |
| 2011/0095608 A1* | 4/2011 | Jonsson | H01R 13/703 307/39 |
| 2011/0098867 A1* | 4/2011 | Jonsson | G06F 1/3209 700/295 |
| 2013/0339760 A1 | 12/2013 | Zimmerman et al. | |
| 2014/0232287 A1* | 8/2014 | Jonsson | H04W 4/80 315/246 |
| 2014/0372773 A1* | 12/2014 | Heath | H04L 12/40045 713/300 |
| 2015/0048758 A1 | 2/2015 | Carrigan et al. | |
| 2015/0195883 A1 | 7/2015 | Harris et al. | |
| 2016/0087446 A1* | 3/2016 | Zainaldin | H04L 12/10 307/104 |
| 2017/0238392 A1 | 8/2017 | Shearer et al. | |
| 2017/0250828 A1 | 8/2017 | Buchanan | |
| 2018/0129257 A1 | 5/2018 | Stewart | |
| 2018/0139823 A1 | 5/2018 | Hick et al. | |
| 2018/0177026 A1 | 6/2018 | Bowser et al. | |
| 2018/0183264 A1 | 6/2018 | Crenshaw | |
| 2018/0323981 A1 | 11/2018 | Zhuang et al. | |
| 2020/0303944 A1* | 9/2020 | Jonsson | G01R 19/10 |
| 2022/0052874 A1* | 2/2022 | Cananzi | H04B 3/54 |
| 2022/0374064 A1* | 11/2022 | Biswas | G06K 7/10207 |
| 2023/0038813 A1* | 2/2023 | Tian | H04L 12/40045 |
| 2024/0297804 A1* | 9/2024 | Boemi | H02J 1/08 |
| 2025/0185146 A1* | 6/2025 | Jonsson | H04L 12/10 |

OTHER PUBLICATIONS

"Power over Ethernet: Cisco Inline Power and IEEE 802.3af", Jan. 1, 2004, Retrieved from http://www.cisco.com/warp/public/cc/so/neso/bbssp/poeie_wp.pdf on May 31, 2006.

European Patent Office, International Search Report for related application PCT/US2024/0100797, Apr. 29, 2024.

European Patent Office, Written Opinion of the International Searching Authority for related application PCT/US2024/0100797, Apr. 29, 2024.

Hirschmann, Power Over Ethernet, 2011, retrieved from http://belden.picturepark.com/Website/Download.aspx?DownloadToken=73468f0b-3d68-4ec4-a295-81d58eec2bc1&Purpose=AssetManager&mime-type=application/pdf on Mar. 23, 2019.

Korean Intellectual Property Office, International Search Report for PCT/US2020/024112, Jul. 23, 2020.

Korean Intellectual Property Office, Written Opinion of the International Searching Authorigy for PCT/US2020/024112, Jul. 23, 2020.

Microsemi, Next-Generation PoE: IEEE 802.3bt, 2016, retrieved from https://www.microsemi.com/document-portal/doc_view/136209-next-generation-poe-IEEE-802-3bt-white-paper on Mar. 23, 2019.

Schindler, Fred, Link Layer Discovery Protocol LLDP, Jan. 2015, retrieved from http://www.ieee802.org/3/bt/public/jan15/schindler_3bt_1_01_15.pdf on Mar. 23, 2019.

Wikipedia, Power Over Ethernet, May 23, 2019, Retrieved from https://en.wikipedia.org/w/index.php?title=Power_over_Ethernet&diff=898449968&oldid=894957528 on Aug. 22, 2019.

Yseboodt, et al., Overview of 802.3bt—Power over Ethernet standard, Apr. 2018, retrieved from https://ethernetalliance.org/wp-content/uploads/2018/04/WP_EA_Overview8023bt_FINAL.pdf Jul. 3, 2023.

* cited by examiner

| "A" Resist. | Drive | Alternative Configuration / Comment |
|---|---|---|
| 6.5 (6.49) kΩ | 800 mA CC | 2x 400 mA CC Devices in Parallel |
| 7.0 (6.98) kΩ | 1000 mA CC | 2x 500 mA CC Devices in Parallel |
| 7.50 kΩ | 1200 mA CC | 2x 600 mA CC Devices in Parallel OR 4x 300 mA CC Devices in Parallel |
| 8.0 (7.96) kΩ | | |
| 8.5 (8.45) kΩ | 48V CV | |
| 9.0 (8.98) kΩ | Reserved | |
| 9.5 (9.53) kΩ | 36V CV | |
| 10.0 kΩ | 900 mA CC | 3x 300 mA CC Devices in Parallel |
| 10.5 kΩ | | |
| 11.0 kΩ | Input Device | "B" Sig. Res. Is Boolean Input |
| 11.5 kΩ | 24V CV | |
| 12.0 kΩ | Input Device | "B" Sig. Res. Is Continuous Input |
| 12.5 (12.4) kΩ | Manual Config | Default to 100 mA CC |
| 13.0 kΩ | 400 mA CC | |
| 13.5 kΩ | Reserved | |
| 14.0 kΩ | 500mA CC | |
| 14.5 kΩ | Reserved | |
| 15.0 kΩ | 600 mA CC | 2x 300 mA CC Devices in Parallel |
| 15.5 (15.4) kΩ | | |
| 16.0 kΩ – 30.5 kΩ | IEEE PoE | IEEE PoE Compliant Devices |
| 31.0 (30.9) kΩ | 300 mA CC | |
| 32.0 kΩ – 35.0 kΩ | Reserved | Four 1 kΩ wide slots for reserved for future use |

FIG. 5A

| "B" Resist. | UI Elements | Comment |
|---|---|---|
| < 6.0 kΩ | Depends on Default | Two or more PD in Parallel<br>Use "A" Config for Both Channels<br>PSE to default to one of<br>    Two Separate Channels<br>    Aggregated Load<br>    Tunable CCT White |
| 7.0 (6.98) kΩ | Two Sliders | Two Separate Channels<br>Use "A" Config for Both Channels |
| 8.0 (7.96) kΩ | Single Slider | "Aggregated Load"<br>Power from both Channels into a Single Load<br>Use "A" Config for Both Channels |
| 9.0 (8.98) kΩ | Dimming Slider & CCT Slider | Tunable CCT White<br>Use A Config for Both Channels |
| 11.0 kΩ | Slider & Switch | Switchable Aux Power<br>A Pairs Use "A" Config<br>B Pairs 48V Switched (non-dimming) |
| 12.0 kΩ | Status Icon | USB Outlet |
| 13.0 kΩ | Variable | Simple Data Comm. from PD |
| 14.0 kΩ | Slider & Selector OR 2 Sliders | A Pairs use "A" Config for Light<br>B Pairs for Ceiling Fan |
| 15.0 kΩ | Single Slider | "Aggregated Load"<br>Power from both Channels into a Single Load (Extended IEEE mode up to 2x60W) |
| 16.0 kΩ – 30.0 kΩ | Reserved | IEEE POE Compliant Devices |
| 31.0 (30.9) kΩ | Status Icon | Emergency Lighting<br>Use "A" Config for Both Channels |
| > 35.0 kΩ | Single Slider | No "B" Resistor<br>Uses Power from A Pairs Only |

FIG. 5B

RESISTOR MAPPING FOR DEVICE PROFILES

CROSS-REFERENCE TO RELATED APPLICATIONS

This application is a continuation of International Patent Application PCT/US2024/010797 entitled "Resistor Mapping for Device Profiles" and filed on Jan. 9, 2024, which claims priority to U.S. Provisional Patent Application 63/512,495 entitled "Resistor Mapping for Device Profiles" which was filed on Jul. 7, 2023. Both of the above-mentioned applications are incorporated by reference for any and all purposes.

This application is related to U.S. patent application Ser. No. 16/455,975, entitled "Remote Dimming of Lighting" which was filed on Jun. 28, 2019 and issued on Aug. 25, 2020 as U.S. Pat. No. 10,757,791 and is hereby incorporated by reference for any and all purposes.

TECHNICAL FIELD

The present subject matter relates to controlling a lighting source via data-bus transmission, and more specifically, to determining a power requirement of the lighting source which is powered over an ethernet-compatible cable.

BACKGROUND

Traditionally, LED drivers receive the incoming power from an AC mains line or in rare cases from a Direct Current source. One emerging trend for DC distribution for information technology (IT) equipment, telephones, cameras, and more recently, lighting, is power over Ethernet (PoE). PoE comes in several flavors that mainly are differentiated by power capacity. The Institute of Electrical and Electronics Engineering (IEEE) standard 802.3af was the first PoE standard to be adopted. It specified a way to provide Ethernet data and power up to 15.4 watts (W) through a single cable which was ideal for telephones. IEEE 802.3at came later with capacity up to 30 W and most recently IEEE 802.3bt allows up to 100 W to be provided at voltages up to 57 V. There are also proprietary flavors of PoE such as Cisco Systems' UPoE, Linear Technology's LTPoE, and Microsemi's PowerDsine solution. Devices that source PoE power are known as power sourcing equipment (PSE) and a device that consumes PoE power is known as a powered device (PD).

Some PSEs simply provide a set amount of power at all times, with no negotiation, which may be referred to as passive PoE. Passive PoE is simple and inexpensive but can lead to situations where a PD and PSE are not compatible with each other with no indication of an error other than the fact that the PD does not operate properly. In some cases, this can even lead to damage to the PSE or PD. A PD that is compliant with IEEE PoE standards includes a 25 k$\Omega$ (kilohm) resistor between the powered pairs. Additional information about the power requirements of a PD may be determined providing a classification voltage to the PD and measuring the resultant current, and/or by using Link Layer Discovery Protocol (LLDP) over the Ethernet connection to determine the power requirements of the PD.

BRIEF DESCRIPTION OF THE DRAWINGS

The accompanying drawings, which are incorporated in and constitute part of the specification, illustrate various implementations. Together with the general description, the drawings serve to explain various principles. In the drawings:

FIGS. 5A and 5B show tables of example resistance values to use for signature resistors in an X-PoE PD such as the example shown in FIG. 2A or 2B;

DETAILED DESCRIPTION

Figure 1:
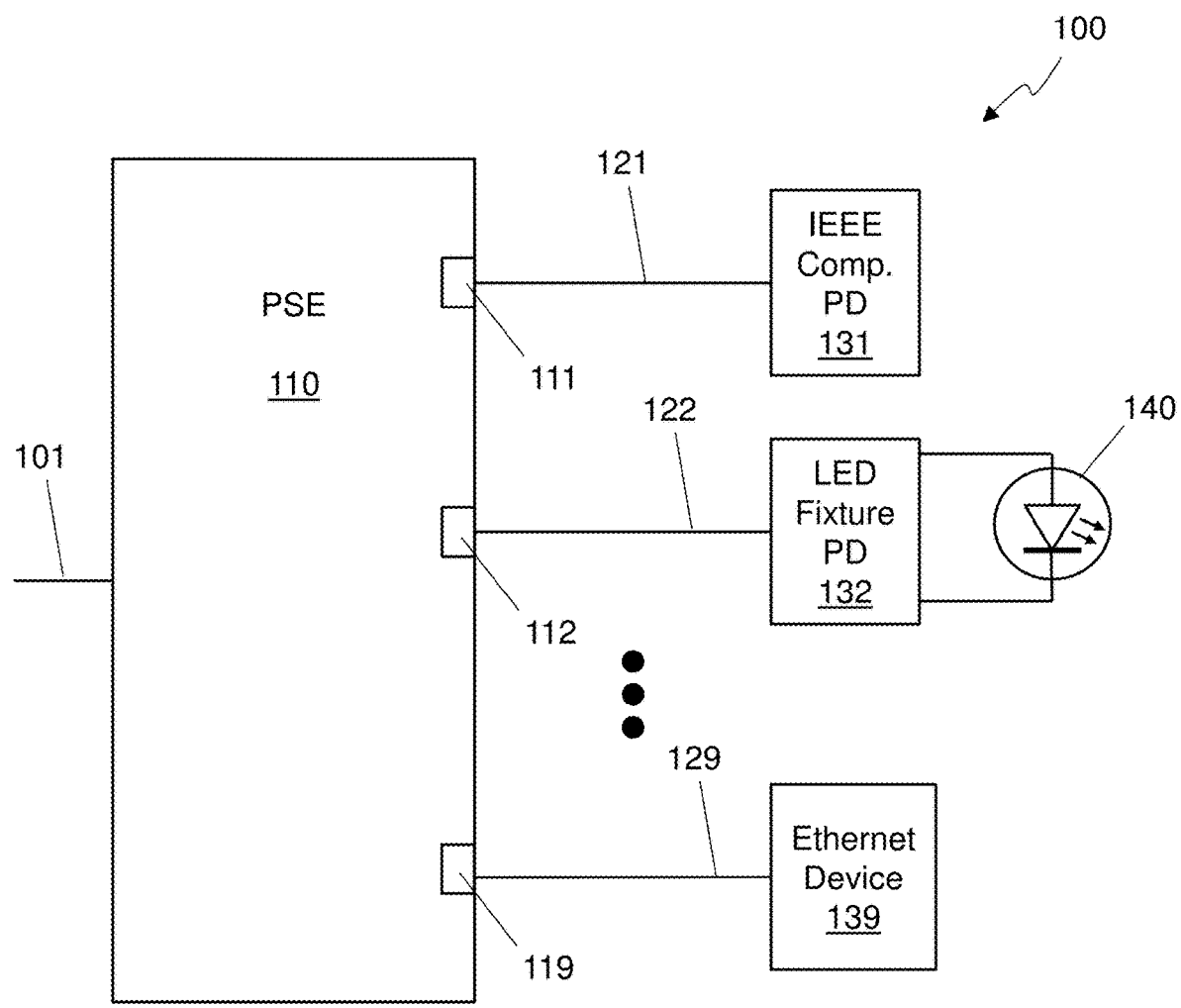
FIG. 1 shows a block diagram of an example of a extended power-over-Ethernet (X-PoE) system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various implementations of this disclosure. These descriptive terms and phrases are used to convey a generally agreed upon meaning to those skilled in the art unless a different definition is given in this specification. Some descriptive terms and phrases are presented in the following paragraphs for clarity.

PoE=Power Over Ethernet as defined by IEEE 802.3af/at/bt.

X-PoE=Extended Power over Ethernet. A system that provides extended functionality beyond IEEE compliant PoE as described herein.

LED=Light Emitting Diode, including both traditional LEDs and Organic LEDs.

PSE=Power Sourcing Equipment (commonly a System on Chip for negotiating PoE Power on the Ethernet Switch side). This term may be used for IEEE compliant PSEs as well as for PSEs implementing X-PoE functionality as described herein.

PD=Power Device. A PD is often implemented as a System on Chip for negotiating PoE Power on the receiving side. This term may be used for IEEE compliant PDs as well as for PDs implementing X-PoE functionality as described herein.

DC=Direct Current

Implementations are described herein that allow an Ethernet switch, router, or other equipment, to be configured to be compliant with IEEE power-over-Ethernet (PoE) standards such as 802.3af, 802.3at, and 802.3bt as power sourcing equipment (PSE) but provide an additional capability to power and control other types of loads, such as LED lighting loads by directly providing the power for the LEDs. This means that the module connecting to the PoE cable may not include power conversion and/or complicated control circuitry and may be able to directly provide the power from the PoE cable to the load itself. In some implementations, the load may not include a data connection to the Ethernet network, so that all of the intelligence to expose the load to the network and respond to network control of the load is handled in the PSE. This may allow for a much lower-cost device than traditional networked solutions, such as a traditional networked LED driver as is common in commercial installations today.

Implementations may be included in a traditional PoE PSE Ethernet switch and may support IEEE standards-compliant PDs in addition to PDs consistent with the disclosures herein, although some implementations may not support IEEE compliant PoE PDs. In some implementations, the device driving the PoE cables may not include Ethernet switching capability at all, but may simply expose the lighting devices to the network as a network end-point and control the lighting devices by the amount of power provided to the cables connecting the lighting device to the PSE.

Ethernet switches or other devices acting as PSE should be compliant with appropriate IEEE standards, such as 802.3af, 802.3at, and 802.3bt, to determine how much power can be provided and whether to provide that power on 2 pairs of wires of the Ethernet cable or on all 4 pairs of wires. While the appropriate IEEE standards should be consulted for a full description of how the power negotiation is performed, a quick overview is presented here. An IEEE compliant PSE initially detects whether or not the PD has a signature resistance between PoE power pins of 19-26.5 k$\Omega$ (using a voltage of 2.7V-10.1V). If the PD has a valid signature resistance, the PSE applies a classification voltage of 14.5V-20.5V and detects the current drawn by the PD to determine a power class for the PD. In addition, communication over the Ethernet connection at the link layer using LLDP may be used for higher power classes defined by IEEE 802.3bt. As of the time of this filing, 8 power classes are defined for PoE PDs by IEEE specifications.

The inventor realized that by providing a different signature resistance, it would be possible to have a PD that did not indicate IEEE compliance and yet provide other mechanisms for the PD to provide its characteristics to the PSE. This allows the PSE to provide specialized support for the PD while still (optionally) being fully compliant with IEEE standards for PoE. As one example, the PSE may determine that the PD is an LED load and provide a constant current (CC) or constant voltage (CV) drive signal for the LED(s) over the Ethernet cable and also may modulate that signal using pulse-width modulation (PWM), pulse-density modulation (PDM), or analog modulation (i.e., changing the steady state current or voltage level) to control the brightness of the LED(s). This may be referred to as Extended Power over Ethernet (X-PoE). While it might be possible to provide similar information using LLDP or other data communication over Ethernet between the PD and the PSE, that may add significant complexity and cost over other implementations disclosed herein.

In some implementations, the PSE in an X-PoE system may utilize a standard PSE integrated circuit with additional logic to manage the non-standard devices, but in other implementations, both standards-compliant PoE and X-PoE PoE can be implemented using a standard microcontroller (MCU) or other processor. By adding a proprietary extension to an IEEE 802.3 compliant PoE switch it may be possible to reuse the power limiting features of the PSE or dedicated MCU to dim individual LED loads directly from the X-PoE switch. This eliminates the redundancy of having to receive PoE power decoupled from the LED driver circuit and performing DC-to-DC conversion in the PD and allows a "driverless" end point at a PD functioning as a luminaire, saving significant cost and yielding better efficiency. The X-PoE PSE could still be a fully IEEE compliant and operate as a standard POE switch or router when used with compliant PoE PD loads but, for example, allow the extension to operate as CC LED dimmer for individual ports coupled to a custom LED load. As the PoE standard requires individual classification by port, a X-PoE switch could offer a hybrid mode where some ports are connected to LED loads (or other custom PoE loads) and others to standard PoE compliant devices.

An implementation of a X-PoE PD consistent with this disclosure may include a signature resistor outside of the valid 19-26.5 k$\Omega$ range specified by IEEE PoE standards to indicate that it is not standards compliant. Implementations may use two separate signature resistors connected to different ethernet cable pairs to provide additional information and enable two power channels to be configured on the same cable. This may be used for separate sets of LEDs, an aggregate load that uses power from both channels for the same set of LEDs, or for a set of LEDs that have an adjustable color temperature, with one channel driving a set of cool white LEDs (e.g. 5000K bluish LEDs) and the other channel driving a set of warm white LEDs (e.g. 2700K orangish LEDs).

The type of information can also include whether the set of LEDs should be driven using a constant current (CC) signal and at what current level, or that the set of LEDs should be driven using a constant voltage (CV) signal and at what voltage level. Note that as the phrases are used herein, a constant current signal is synonymous with a current regulated signal and the current may vary over time. Similarly, a constant voltage signal is synonymous with a voltage regulated signal and the voltage may vary over time. In some implementations, resistor values between 6 k$\Omega$, and 35 k$\Omega$ are used which may allow legacy IEEE PoE PSE solutions to accurately measure the resistance value. Some implementations may be able to accurately measure higher or lower resistances to allow a wider range of signature resistor values. A range for IEEE PoE detection resistances (plus a guard band) may be removed for compatibility, So, for example, resistances between 16 k$\Omega$ and 30.5 k$\Omega$ may be avoided for use by X-PoE PD devices.

An Ethernet cable used for PoE (e.g. a category 5, category 5e, category 6, or category 7 cable) contains 4 twisted pairs of wires that are typically 20-24 AWG. 10/100BASE-T Ethernet (10/100 Mb Ethernet) only utilizes 2 of the 4 twisted pairs for data communication, while 1000BASE-T (Gb Ethernet) uses all 4 pairs for data communication. Depending on the PoE power classification, two or four pairs may be used for power. The IEEE PoE standards define which power classes use two pairs and which power classes require all 4 pairs to deliver IEEE PoE compliant power. X-PoE PDs use a first signature resistor connected between the two pairs of "A" wires of the Ethernet cable to request a specific configuration of power to be delivered to the PD using those pairs of wires. The resistance value selected provides information such as CC vs CV drive and a voltage or current level for full brightness. An X-PoE PD can optionally request power on the other two pairs of wires on the Ethernet cable by providing a second signature resistor connected between the two pairs of "B" wires on the Ethernet cable. In some implementations, the second resistance value may use the same mapping of resistance to configuration as the first resistance value and simply request a particular type and level of power signal in the same way that the first resistance value does, but in other implementations, a different set of resistance to configuration mappings are used which may convey additional information about the both the first and second power channel.

For at least the first signature resistor, the resistance values may be selected to allow two or more identical loads to be connected in parallel or in series, and to have the combined resistance value map to a drive level capable of driving both loads. So as a non-limiting example, a resistance value of 31 kΩ may be used to indicate that a 300 mA CC driver should be used, a resistance value of 15.5 kΩ may be used to indicate that a 600 mA CC driver should be used, and a resistance value of 10.3 kΩ may be used to indicate that a 900 mA CC driver should be used. Thus, if two X-PoE PDs with a 31 kΩ signature resistor are connected in parallel to a X-PoE PSE, it will detect a 15.5 kΩ resistance, and configure the power provided to be a 600 mA CC driver, which can provide enough power to drive both X-PoE PDs. As a further example, if three X-PoE PDs with a 31 kΩ signature resistor are connected in parallel to a X-PoE PSE, it will detect a 10.3 kΩ resistance, and configure the power provided to be a 900 mA CC driver, which can provide enough power to drive all three X-PoE PDs In some implementations, a particular resistance value for the second signature resistor may indicate that the PD is capable of serial communication with the PSE to provide an additional information. Any type of communication protocol may be used for the communication between the PD and the PSE consistent with this disclosure, such as, but not limited to, RS-232, RS-422, RS-485, basic universal asynchronous receiver-transmitter (UART) protocols, inter-integrated circuit ($I^2C$), universal serial bus (USB), other full-duplex or half-duplex bidirectional serial protocols, unidirectional serial protocols, parallel communication protocols, combinations of pre-determined voltage levels on the wires of the cable, or any other type of communication between the PD and the PSE.

Any amount or type of information may be provided by the PD to the PSE using the communication protocol, depending on the implementation, some of which may be duplicative with the information provided by the choice of the first and second signature resistors, such as a CV voltage level or CC current level to be used to drive the LED(s). The LED driver may also communicate other information, such as information about which wire pairs on the PoE cable are used, information about different LEDs coupled to different wire pairs, minimum and/or maximum allowable current and/or voltage levels, brightness vs voltage relationships (e.g. curves or tables), brightness vs current relationships, or any other information related to the PD or external device (e.g. LEDs or LED arrays) coupled to the PD. In some implementations, a PD coupled to an LED array with different color LEDs coupled to different wire pairs, such as a luminaire with red LEDs coupled to a first wire pair, green LEDs coupled to a second wire pair, blue LEDs coupled to a third wire pair, and white LEDs coupled to a fourth wire pair, may provide information about the configuration to the PSE which can then control the color of the luminaire by the ratio of the currents provided on the different wire pairs. In another example, information indicating that cool white LEDs (e.g. 5000K) are coupled to two of the wire pairs and warm white LEDs (e.g. 2700K) are coupled to the other two wire pairs may be provided to the PSE which allows the PSE to control a color temperature of the white light from the luminaire.

Information to be provided by the PD can be programmed into the PD at the factory during manufacturing, after manufacturing but before installation, at installation, or even after installation, using any technique, including, but not limited to, programming a non-volatile memory and including that in the PD, installing one or more resistors with particular valuables representing various information, setting jumpers or switches on the PD, or having code in a processor of the PD that can query an attached LED array to determine information about the array. In some implementations, a non-volatile memory of the PD may be programmed in-situ. This can be done using any technique, including, but not limited to, sending the information to be programmed into the non-volatile memory to the PD and having circuitry on the PD program the non-volatile information, using a test fixture to program the non-volatile memory on the PD, or using a radio-frequency identification (RFID) signal to program an RFID tag (e.g. a near field communication (NFC) tag or other type of RFID tag) which acts as the non-volatile memory on the PD.

After receipt of the information from the PD, the PSE may control the PD based on the information received. In addition, the PSE may expose the PD as a device on a network, which may be the Ethernet network switched by the PSE, based on the information received. In some implementations, the PSE may expose an individual PD as a device on the network, but in other implementations the PSE may aggregate multiple PDs into a single entity to be exposed on a network. If the network utilizes internet protocol (IP), an IP address may be allocated for each individual PD, an aggregate of PDs, or as functions within the PSE which may have its own IP address. Any discovery protocol may be used to expose the device and its capabilities to other devices on the network, including, but not limited to, IP-based discovery protocols such as universal plug-and-play (UPnP), simple service discovery protocol (SSDP—which uses UPnP protocols), multicast domain name service (mDNS), or AllJoyn (which utilizes mDNS). Any data structure, protocol, or technique can be used to specify the functionality and control parameters of the PD through the discovery service, including, but not limited to, DotDot from the Zigbee Alliance, lightweight machine-to-machine protocol (LWM2M) from the Open Mobile Alliance (OMA), specifications from the Open Connectivity Foundation (OCF), Mesh Objects, JavaScript Object Notation (JSON) objects, extensible Markup Language (XML) objects, other standards, data structures, or mechanisms, or combinations thereof. Once the existence and capabilities of the PD are exposed on the network, other applications, devices, or entities may control the PD through the PSE, but the exact mechanisms used to do that, which may be standards-based or proprietary, are beyond the scope of this disclosure, although examples might include the ability to turn the LEDs coupled to the PD on or off, set a brightness level of the LEDs, control a color or color temperature of the LEDs or query a status of the LEDs.

Last but not least, since a PSE can measure Signature Resistor, Current and Forward Voltage of all channels on a PoE switch individually, a machine learning software feature could be implemented to map/profile normal/daily behavior of each lighting channels by triangulating the 3 measured values over time. This would allow a switch to immediately detect and alert abnormal behavior like water leaks and moisture where consumption profile would change drastically in a short time, or longer term profile change to calculate remaining lifetime and health of an LED as an example.

Reference now is made in detail to the examples illustrated in the accompanying drawings and discussed below.

FIG. 1 shows a block diagram of an example of an extended power-over-Ethernet (X-PoE) system 100. The system 100 includes power sourcing equipment (PSE) 110 coupled to a computer network 101. The computer network 101 may be any type of computer network, wired or wireless, but in some embodiments the computer network 101 may be an Ethernet network such as, but not limited to, a 10BASE-T, a 100BASE-T, or a 1000BASE-T network that utilizes a data cable with 4 pairs of wires. The data cable may be known as a category 3, a category 5, a category 5e, a category 6, or a category 7 cable in some embodiments. The data cable may utilize wires having any size but some embodiments, may use wire with 20-24 AWG and the data cable may be shielded or unshielded. In other embodiments, the computer network 101 may be a wireless network, such as a Wi-Fi® network or a 4G or 5G cellular network.

The PSE 110 includes one or more connectors 111-119 which may be used to couple to other devices 131-139 using data cables 121-129. The connectors 111-119 may be any type of connector, but in some embodiments, the connectors 111-119 are RJ-45 connectors as specified for 10/100/1000BASE-T networks. The PSE 110 may include Ethernet router, switch or hub functionality in some embodiments but in other embodiments, the PSE 110 may be a mid-point device which simply injects power on the data cables 121-129 without impacting the data communication. In at least one embodiment, the PSE 110 is an end point device which terminates the network 101 and simply provides power to other devices 131-139.

Devices 131-139 coupled to the PSE 110 may be a device 139 which does not use power from its data cable 129, a device which is a powered device (PD) 131 compliant with an IEEE PoE standard, or a powered device 132 which is non-compliant with an IEEE PoE standard. The devices 131-139 may implement any function and may connect to the Ethernet network provided from the PSE 110. In some embodiments, however, the PD 132 may not include circuitry to connect to the Ethernet network and may simply communicate with the PSE 110 over the data cable (i.e., Ethernet cable) 122 using signature resistance values and/or other communication protocols.

The PD 131 includes an Ethernet device that couples to cable 121 and then to the PSE 110 through connector 111. The Ethernet device in the PD 131 may implement any functionality, including, but not limited to, a wireless access point, a printer, another network switch/router, a camera, a voice-over-IP (VOIP) phone, an IP television (IPTV) set-top box (STB), or a networked LED driver. It also includes IEEE compliant PoE circuitry to receive power over the cable 121 for use by the PD 131.

In some embodiments, the PD 132 may be coupled to one or more LEDs 140 or may include one or more LEDs 140. As the term is used herein, an LED may be a traditional light emitting diode, an organic light emitting diode, or any other type of solid-state device which emits light dependent upon an amount of current passing through it. In at least one embodiment, the PD 132 may include a circuit board that includes an RJ-45 socket (i.e. a female connector) to couple to data cable 122. The RJ-45 socket may also be referred to as an Ethernet connector. The circuit board of PD 132 may include one or more signature resistors to indicate information related to the LED 140, such as a CC drive current level or a CV drive voltage level.

Figure 2A:
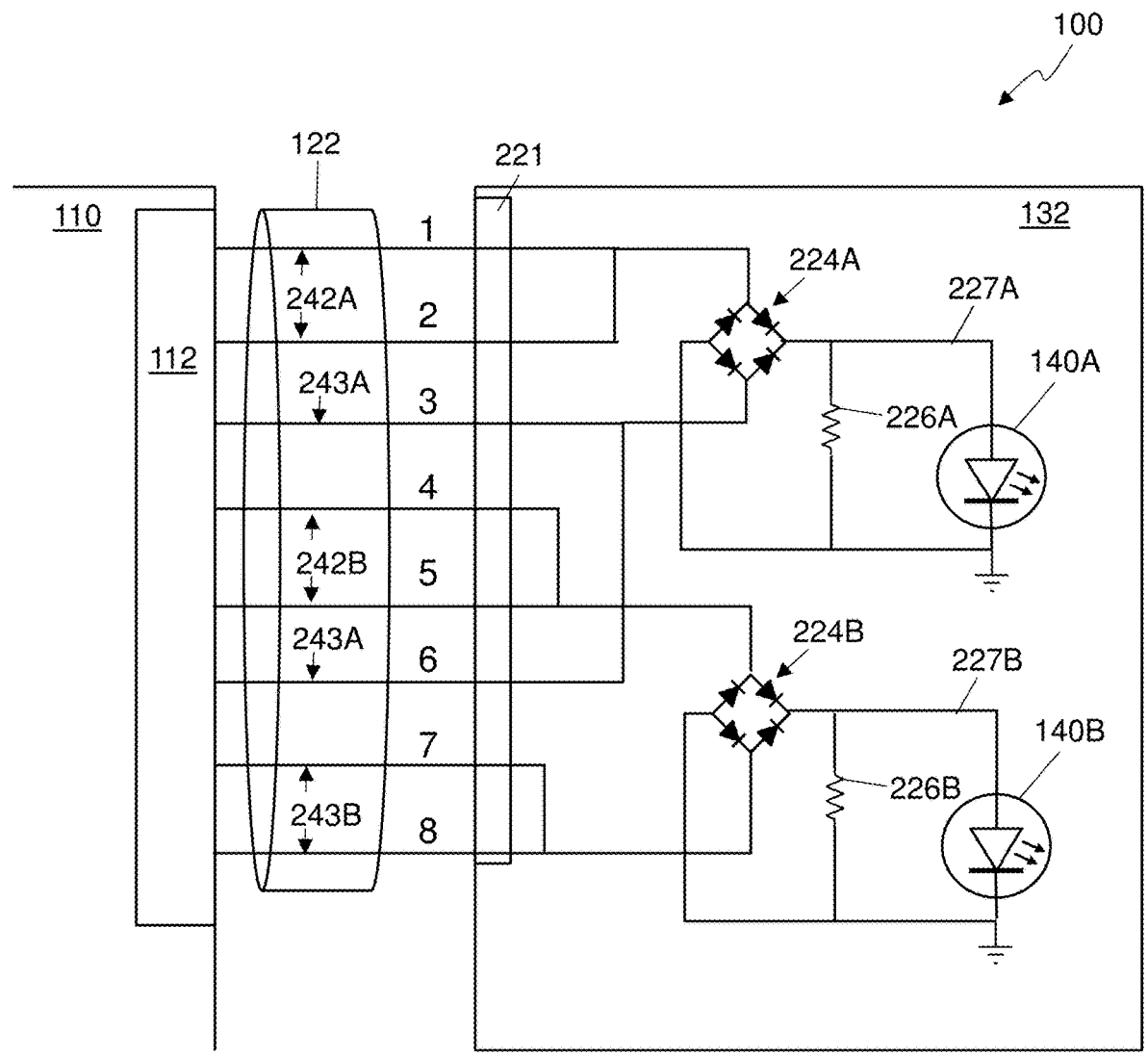
FIGS. 2A and 2B show more detailed block diagrams of example light fixture powered devices (PD) in the X-PoE system.

FIG. 2A shows a more detailed block diagram of the example light fixture powered device (PD) 132 in the X-PoE system 100. IEEE compliant PoE is primarily designed for Information Technology (IT) devices such as IP Telephones, IP Cameras, and other IT gear. For lighting, IEEE compliant PoE can be expensive as each light, or a set of lights consuming up to 90 W of power, need to host an expensive receiver to perform the PD function (negotiation of power), communicate to a network and perform dimming and control of an LED light. All of this requires a microcontroller, Physical Layer chipsets, Ethernet termination magnetics, LED driver chips and several other electronics making PoE for lighting less viable.

The light fixture PD 132 is not compliant with an IEEE PoE standard, which means that it does not fully implement the negotiation defined in those standards for determining how much power the PD 132 is requesting nor can it communicate using an Ethernet protocol. PSE 110, may be compliant with IEEE PoE standards and includes a connector 112 coupled to an Ethernet cable 121-129 which has 4 twisted pairs of wires. While other wiring schemes may be used in embodiments, one pair of wires (green/white and green wires in the TIA-568A wiring scheme, i.e., the green pair) of cable 122 is coupled to pins 1 and 2 of connector 112, a second pair of wires of cable 122 (orange/white and orange wires in the TIA-568A wiring scheme, i.e., the orange pair) is coupled to pins 3 and 6 of connector 112, a third pair of wires of cable 122 (blue and blue/white wires in the TIA-568A/B wiring schemes, i.e., the blue pair) is coupled to pins 4 and 5 of connector 112, and a fourth pair of wires of cable 122 (brown/white and brown wires in the TIA-568A/B wiring schemes, i.e., the brown pair) is coupled to pins 7 and 8 of connector 112. The green pair and the orange pair (connected to pins 1/2 and 3/6 of the RJ-45 222 respectively) are collectively referred to herein as the "A" pairs of wires 242A, 243A and "A" pairs of contacts 342A, 343A and are defined for use in 10/100 Mb Ethernet data communication while the blue pair and the brown pair (connected to pins 4/5 and 7/8 of the RJ-45 221 respectively) are collectively referred to herein as the "B" pairs of wires 242B, 243B and "B" pairs of contacts 342B, 343B and are unused for 10/100 Mb Ethernet data communication but used with the "A" pairs for 1 Gb Ethernet. Note that cable 122 and connector 112 are used as an example above, but the description applies equally well to the other Ethernet cables 121-129 and Ethernet connectors 111-119 shown in FIG. 1.

IEEE PoE standards define mechanisms to send power over the Ethernet cable 122. Various configurations are defined, including sending power over the "B" pairs of wires 242B, 243B unused by 10/100BASE-T Ethernet for data communication, sending power over the "A" pairs of wires 242A, 243A used by 10/100/1000BASE-T Ethernet for data communication, or all 4 pairs of wires on the data cable 121. An IEEE compliant PD includes additional circuitry to enable the PSE 110 to determine that the PD is compliant with an IEEE PoE standard. The circuitry in an IEEE compliant PD includes a signature resistor between the "A" pairs of wires 242A, 243A (and/or the "B" pairs of wires 242B, 243B) that has a nominal resistance of 25 kilo-Ohms (kΩ) which is used to indicate to the PSE 110 that the PD is compliant with IEEE PoE specifications. In implementations, the circuitry may also include Ethernet magnetics, power circuitry including one or more rectifiers and, in some implementations, an Ethernet transceiver and microcontroller.

PD 132 is an embodiment of an X-PoE LED driver PD which is not compliant with IEEE PoE standards. PD 132 is coupled through its RJ-45 connector 221 using a standard Ethernet cable (e.g. category 3, 5, 5e, 6, or 7) 122 to the RJ-45 connector 112 of the PSE 110. Note that PD 132 in this embodiment does not include an Ethernet device and does not communicate using Ethernet protocols. The light fixture PD 132 forgoes most of the electronics of an IEEE compliant PD, including any Ethernet-specific electronics, to minimize cost, although other implementations may include Ethernet circuitry to allow the PD 132 to communication using Ethernet protocols. The light fixture PD 132 has a rectifier 224A coupled to the "A" pairs of the Ethernet cable 122. The rectifier 224A provides a positive voltage at output 227A which can be used to drive a first set of LEDs 140A. A first signature resistor 226A is provided to indicate what type of power input is requested from the PSE. In some implementations, the signature resistor 226A may be directly connected to the pins of the RJ-45 connector 221 instead of being behind the rectifier 224A. A wide variety of resistance values may be used, depending on the implementation, but since the PD 132 is not IEEE compliant, it should not use a resistance value near 25 kΩ. The IEEE standard indicates that a PSE shall accept a signature resistance value of between 19 kΩ and 26.5 kΩ, so the resistance of the signature resistor 226A should be outside of that range. In some implementations, a guard-band of 3 kΩ is used so the resistance of the signature resistor 226A should be outside of the range of 16 kΩ to 30 kΩ. FIG. 5A provides more information about example resistance values for the first signature resistor 226A.

Some implementations of an X-PoE PD may be configured to accept power only on the "A" pairs of cable 122 and not accept any power from the "B" pairs. Other implementations, such as the example X-PoE PD 132 shown, can receive power from both the "A" pairs and the "B" pairs by using two rectifiers 224A, 224B to provide power to two independent loads, the first set of LEDs 140A and the second set of LEDs 140B in the example shown. In other implementations, the power from both the "A" pairs and the "B" pairs is combined to drive a single load which may be larger than could be driven from one set wires alone.

The PD 132 may also include power circuitry to accept power provided by the PSE 110 over the cable 122 on the "A" pairs and/or the "B" pairs. Depending on the embodiment, the circuitry may include diodes in various configurations, including the full-wave rectifiers (such as rectifiers 224A, 224B shown) half wave rectifiers, capacitors, inductors, voltage limiters, or other circuitry, including DC-to-DC converters, to generate the one or more power supplies 227A, 227B within the PD 132. Some implementations of the PD 132 may include circuitry to communicate back to the PSE 110 using a serial communication protocol.

The X-PoE PD 132 may optionally include a second signature resistor 226B coupled to the "B" pairs. A resistance value of the second signature resistor 226B may be used to convey additional information about the requested power for the PD 132, such as whether power provided by the "A" pairs and the "B" pairs are to be treated as two independent channels, as a single high-power channel, or as a single color tunable channel. FIG. 5B provides more information about example resistance values for the second signature resistor 226B.

Figure 2B:
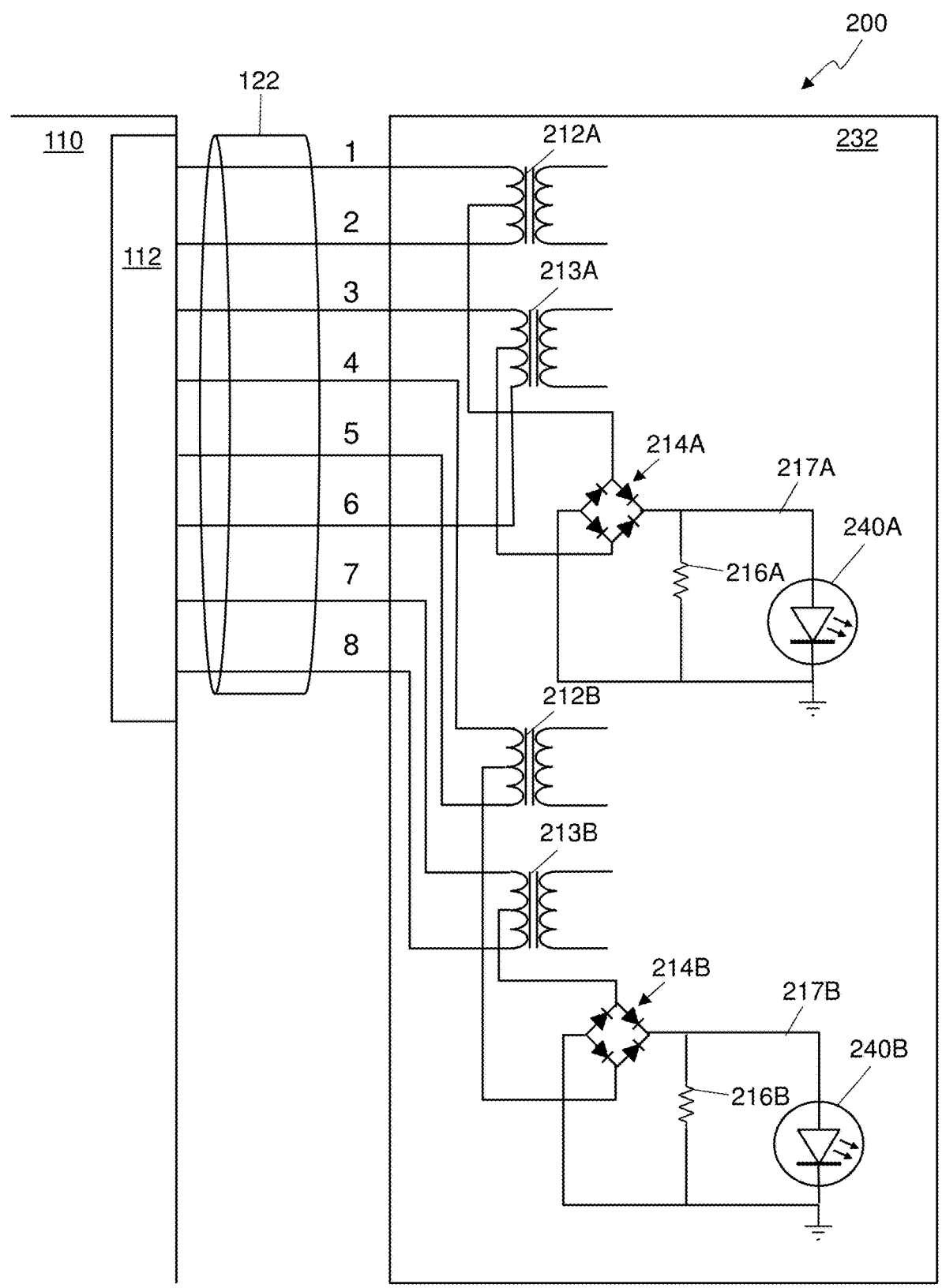

FIG. 2B shows a more detailed block diagrams of a second example light fixture powered device (PD) 232 in the X-PoE system 200. The PD 232 is very similar to the PD 132 except that it includes center-tapped transformers 212A, 212B, 213A, 213B to allow Ethernet communication to occur. Some implementations may then include Ethernet circuitry to allow for Ethernet communication over the cable 122 to the PSE 110. The center tap of the cable-side of the transformers 212A, 212B, 213A, 213B can be connected to the rectifiers 214A/214B to provide power to the loads 240A, 240B through power lines 217A, 217B. The signature resistors 216A, 216B operate in the same manner as for the PD 132 of FIG. 2A.

Figure 3A:
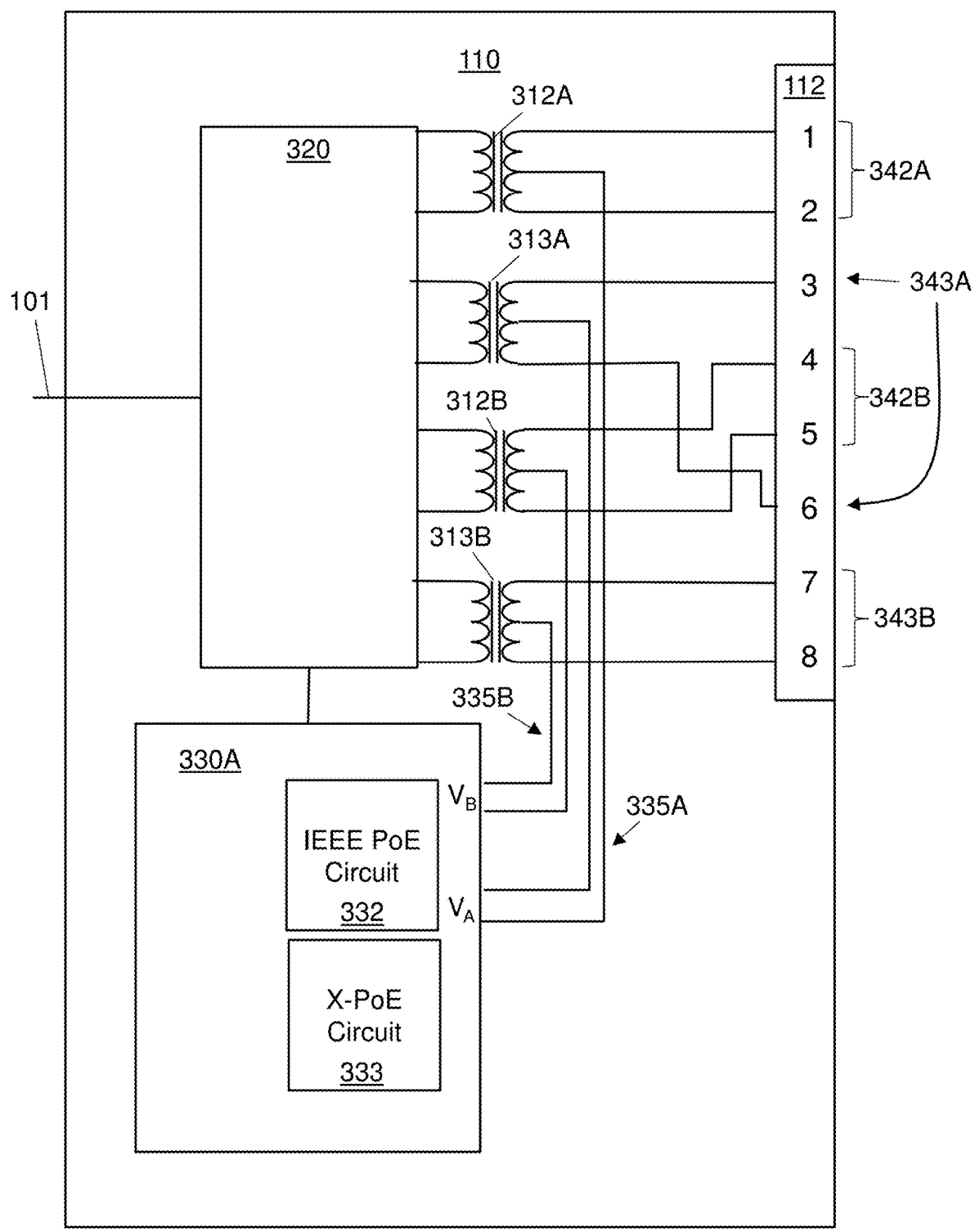
FIG. 3A shows a more detailed block diagram of an example of power system equipment (PSE) in the X-PoE system.

FIG. 3A shows a more detailed block diagram of one port of an embodiment of power system equipment (PSE) 110 of the X-PoE system 100. The PSE 110 may include any number of ports which may be implemented independently or may share one or more of the components shown in FIG. 3A. The PSE 110 has a connection to a network 101, which may be an Ethernet network in some embodiments, and has a connector 112 for the port shown, which may be an 8 contact RJ-45 socket in some embodiments. In some embodiments, the PSE 110 includes an Ethernet switch or router component 320 which can implement layer 2 or higher switching/routing functionality of the Ethernet network and may connect to any number of Ethernet ports. One port of the Ethernet component 320 is coupled to the "A" pairs of contacts 342A, 343A of the connector 112 using transformers 312A, 313A compliant with 10/100/1000BASE-T specifications. The PSE 110 may also have the port of the Ethernet component 320 coupled to the "B" pairs of contacts 342B, 343B of the connector 112 with transformers 312B, 313B compliant with 10/100/1000BASE-T specifications in some implementations. The transformers 312A, 313A, 312B, 313B include a center tap on the connector side to allow DC power to be injected into the respective pairs on a cable plugged into the connector 112.

The PSE 110 also includes PoE circuitry 330A. The PoE circuitry 330A may include standards-compliant circuitry 332 which manages PoE in a way that is compliant with IEEE PoE standards. This may include the detection of a signature resistance and a determination of a class of power, among other requirements of the standards.

The PoE circuitry 330A also includes X-PoE circuitry 333 to provide power to a PD that is not standards-compliant through the connector 112. In some embodiments, the X-PoE circuitry 333 may be merged with PoE circuitry 332 to serve both standards-compliant and non-compliant PDs. The X-PoE circuitry 333 detects that the PD coupled to the connector 111 is not standards compliant yet is requesting power be provided over its cable. This may be done by any method but in some embodiments, it may be determined by providing a voltage across the "A" pairs of pins 342A, 343A of the connector using the $V_A$ connection 335A and detecting a particular range of current (i.e. detecting a signature resistance). This may be done by applying a voltage between 2.7 VDC and 10.1 VDC to the A pair to be compatible with the IEEE PoE specifications. This can be done with the $V_B$ connection of the PoE circuitry 330A disconnected from the "B" pairs so as to not influence the measurement of the signature resistor on the "A" pairs in case the power from both the "A" pairs and the power from the "B" pairs are tied together in the PD. In some implementations, two measurements at two different voltages in the 2.7-10.1 V range may be taken to calculate the resistance and avoid the voltage drop of any rectifier in the PD throwing off the measurement. If it is determined that the signature resistance is in the range of 19-26.5 kΩ, the PD is an IEEE compliant PD and the IEEE PoE standard is followed to negotiate how to provide power to the PD. If, however, the signature resistance is outside of the 19-26.5 kΩ, the value of the resistance is interpreted to determine what power is being requested by the X-PoE PD. Implementations may use the values provided in the table shown in FIG. 5A to interpret the resistance value measured.

A resistance of a second signature resistor coupled to the "B" pairs may also be measured in a similar way to the first signature resistor coupled to the "A" pairs. This measurement may be conducted after it is determined that the first signature resistance is a legal resistance value for X-PoE. A voltage may be provided across the "B" pairs using the $V_B$ connection 335B to measure a signature resistance across the "B" pairs while the "A" pairs are disconnected from the $V_A$ connection of the PoE circuitry 330A. The resistance measured can be interpreted according to the table shown in FIG. 5B.

Thus, the X-PoE circuitry 333 may receive information about the PD through the connector 111. This information may be conveyed by the value of the resistance(s) measured include information about how to power the PD such as a CC drive current, a CV drive voltage, a maximum power draw, a duty-cycle requirement, a configuration of the PD or a load coupled to the PD, or any other information related to the PD or a load coupled to the PD, such as one or more LEDs coupled to the PD.

Once the PSE 110 has determined what, if any, power is requested by the PD connected to the connector 112 (either IEEE PoE compliant negotiation or X-PoE compliant request), it can provide power consistent with that negotiation/request through the $V_A$ connection 335A to the "A" pairs of the connector 112 and/or the $V_B$ connection 335B to the "B" pairs of the connector 112. If the resistance across the "B" pairs is greater than a maximum value for a signature resistor (e.g., 35 kΩ or 100 kΩ depending on the implementation) of an X-PoE implementation, the PSE 110 may determine on its own (i.e., a default behavior) whether to provide the requested power only to the "A" pairs or to provide power consistent with the request for the "A" pairs to the "B" pairs as well.

The PoE circuitry 330A may expose the existence of the PD to the network 101. This may be done through a port of the Ethernet component 320 and may utilize any protocol to advertise the existence of the PD and any capabilities of the PD based on the information received. The PoE circuitry may also receive commands from the network 101 to control the PD and use the circuitry 333 to send a power signal through the connector 111 to the PD based on the commands received through the network 101 and the information received from the PD.

Figure 3B:
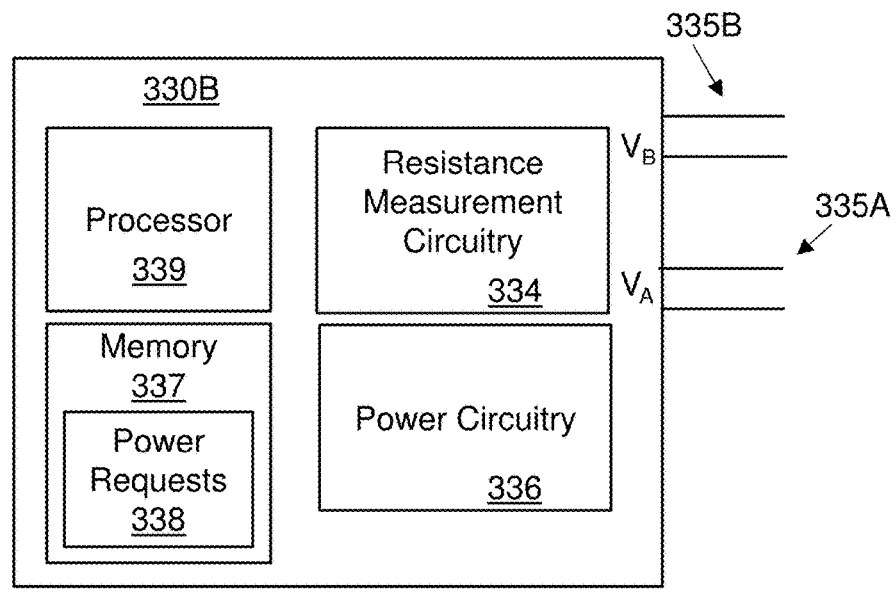
FIG. 3B shows an example alternative implementation of the POE circuitry in an PSE in the X-POE system.

FIG. 3B shows an alternative implementation of the PoE circuitry 330B which may be used in place of PoE circuitry 330A in FIG. 3A. So the PSE 110 is an apparatus for providing power to a device through an Ethernet connector 112. The PSE 110 includes an Ethernet connector 112 having two pairs of "A" contacts 342A, 343A and two pairs of "B" contacts 342B, 343B. It also includes resistance measurement circuitry 334 coupled to the Ethernet connector 112 to allow it to measure a resistance between the two pairs of "A" contacts 342A, 343A and the two pairs of "B" contacts 342B, 343B. Power circuitry 336, coupled to the Ethernet connector 112, is also included to generate one or more power signals at the Ethernet connector 112.

The PSE 110 also includes a memory 337 storing a set of power requests 338. An IEEE power request is included in the set of power requests. The IEEE power request indicates that the power signal should be provided from the power circuitry 336 to the Ethernet connector 112 in a manner compliant with a standard published by an IEEE 802.3 committee. A processor 339 is coupled to the memory 337, the resistance measurement circuitry 334, and the power circuitry 336.

The processor 339 is programmed to obtain a first measured resistance value by measuring a resistance between the two pairs of "A" contacts 342A, 343A of the Ethernet connector 112 using the resistance measurement circuitry 334. It then retrieves a device power request for the device from the set of power requests 338 stored in the memory 337 based on the first measured resistance value. The IEEE power request is to be selected in response to the first measured resistance value being in an IEEE range that includes 19 kΩ to 26.5 kΩ. The processor 339 then provides the power signal from the power circuitry 336 to the Ethernet connector 112 consistent with the device power request.

In some implementations, the memory 337 may also store a set of load type identifiers respectively corresponding to resistance ranges in a second set of resistance ranges. In such implementations, the processor may also be programmed to obtain a second measured resistance value by measuring a resistance between the two pairs of "B" contacts 342B, 343B of the Ethernet connector 112 using the resistance measurement circuitry 334. It may then retrieve a device load type identifier for the device from the set of load type identifiers stored in the memory 337 based on the second measured resistance value. The processor 339 can then control the power circuitry 336 to provide the power signal to the Ethernet connector 112 consistent with both the device power request and the device load type identifier.

The PSE 110 may also include a computer network interface coupled to the processor 339. The processor may be programmed to expose an existence of the device over a computer network 101 coupled to the computer network interface. It may then receive a command for the device over the computer network 101 and control the power signal based on the command.

Figure 4:
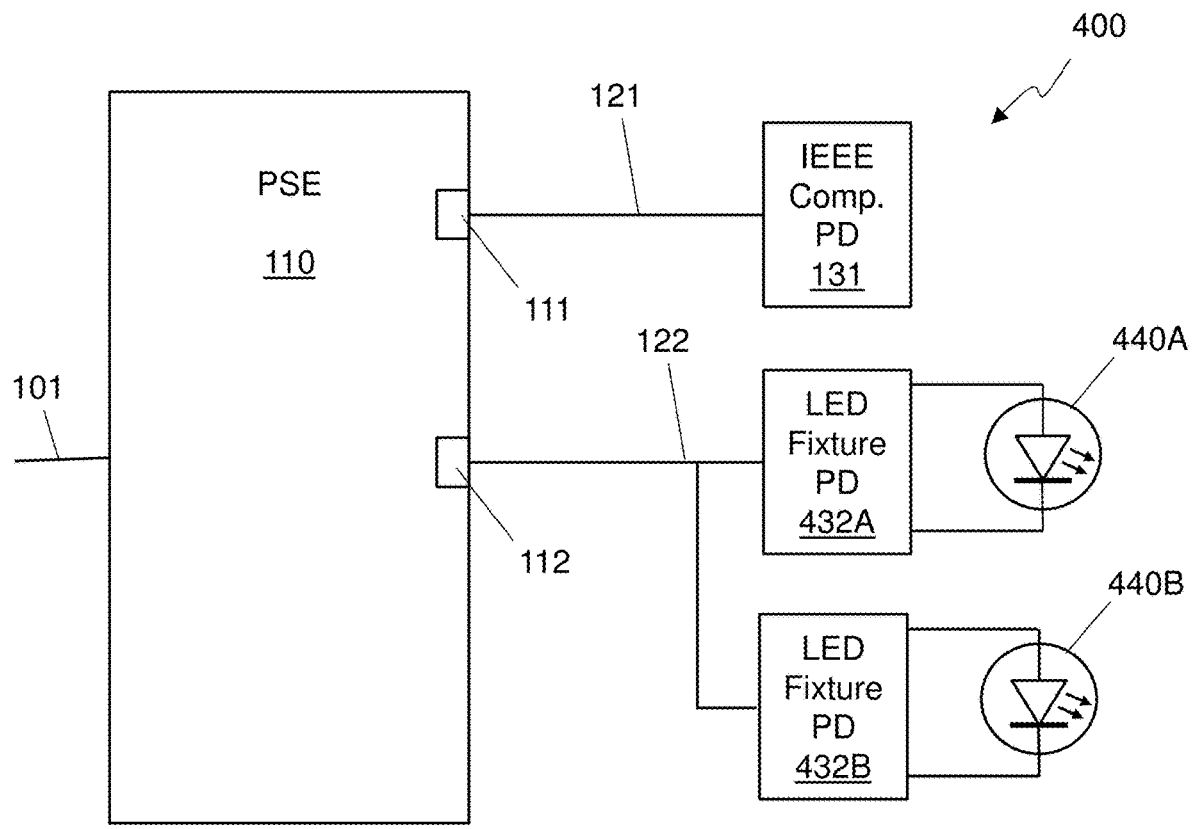
FIG. 4 shows a block diagram of an alternative configuration of an example X-PoE system.

FIG. 4 shows a block diagram of an alternative configuration of an example X-PoE system 400. The system 400 is similar to the system 100 of FIG. 1, with the same X-PoE PSE 110 connected to the network 101 and with two Ethernet connectors 111, 112. A IEEE PoE compliant PD 131 is connected by the cable 121 to the connector 111 of the PSE 110 and the PSE 110 can detect that the PD 131 is compliant with IEEE PoE by detection of signature resistance of 25 kΩ and negotiate with the PD 131 to determine a power level to provide to the PD 131 as defined by the IEEE PoE standards.

Two identical LED fixture PDs 432A, 432B respectively driving LEDs 440A, 440B are connected in parallel to connector 112 of the PSE 110 by cable 122. This can be accomplished in several different ways, depending on the implementation, including providing two separate RJ-45 socket connectors that are connected in parallel directly on the PSE 110, providing an adapter cable that has a single male RJ-45 connector on one end to plug into the PSE 110 and two female RJ-45 sockets on the other end with all three connectors wired in parallel, or by providing two RJ-45 sockets on each LED fixture PD wired in parallel to allow a first cable to be used to connect the first LED fixture PD 432A to the PSE 110 and a second cable to be used to connect the second LED fixture PD 432B to the first LED fixture PD 432A. Any sort of wiring scheme can be used to connect the two LED fixture PDs 432A, 432B to the connector 112 of the PSE 110 in parallel.

When the PSE 110 measures the signature resistance at its connector 112, it will see a resistance value equal to half of the resistance value of the signature resistor in each LED fixture PD 432A, 432B because they are wired in parallel and the equation for two resistors in parallel is (R1×R2)/

(R1+R2) which if R1=R2=R reduces to R/2. So instead of detecting two LED fixtures PD 432A, 432B with a signature resistance of R, it determines that a single LED fixture with a signature resistance of R/2 is connected.

This can be used to an advantage by careful designation of what various signature resistance values mean. If a signature resistance value of R1 is designated to identify a constant voltage (CV) drive level of X volts, then to allow two fixtures with a signature resistor having a resistance value of R1 to be connected in parallel, a signature resistance of R1/2 should also designate a CV drive level of X volts. If a signature resistance value of R2 is designated to identify a constant current (CC) drive level of Y milliAmps (mA), then to allow two fixtures with a signature resistor having a resistance value of R2 to be connected in parallel, a signature resistance of R2/2 should designate a CC drive level of 2×Y mA. Examples of the latter can be seen in the table of FIG. 5A.

Similarly, if two LED fixture PDs having the same signature resistance are connected in series, the signature resistance seen by the PSE will double. So if two LED fixture PDs having the same signature resistance, R1, were to be connected in series, where a signature resistance value of R1 is designated to identify a CV drive level of X volts, then to allow two fixtures with a signature resistor having a resistance value of R1 to be connected in series, a signature resistance of 2×R1 should designate a CV drive level of 2×X volts. If a signature resistance value of R2 is designated to identify a constant current (CC) drive level of Y mA, then to allow two fixtures with a signature resistor having a resistance value of R2 to be connected in series, a signature resistance of 2×R2 should also designate a CC drive level of Y mA.

FIGS. 5A and 5B show tables 501, 502 of example resistance values to use for signature resistors in an X-PoE PD such as the example shown in FIG. 2A/B and/or FIG. 4. These tables are set up to allow certain LED fixture PDs with certain CC drive requirements to be connected in parallel. Different sets of resistance values could be used in implementations supporting parallel connections of CV fixtures or series connection of CV or CC fixtures.

Certain assumptions were made in the generation of the tables 501, 502. First of all, an assumption was made that the circuitry of a PSE should be capable of making a determination of resistance for resistance values in a range of 6 kΩ to 35 kΩ and be accurate to ±1% and that the signature resistors used will have tolerance of 0.1% or less. A maximum cable resistance of 12.5Ω is also assumed. Consistent with IEEE PoE specifications, the resistance measurement should be able to be accurately performed whether or not the signature resistors are behind a rectifier in the PD. It is further assumed that resistances in the range of 16 kΩ to 30.5 kΩ will not be used to assure no conflicts with IEEE PoE signature resistance values. The combination of resistor tolerance and accuracy measurements means that for signature resistor below 16 kΩ (the bottom end of the range allowed for IEEE PoE signature resistors), the measured value should be within 200 Ω of the nominal signature resistance, allowing a gap of 500 Ω between signature resistance values. For resistances in the 30.5 kΩ to 35 kΩ range, the measured value could be as great as 400 Ω off from the nominal value, so a 1 kΩ gap between signature resistance values may be required. If different assumptions are made, different resistance values may be useable.

The data in the tables 501, 502 may be stored in a data structure in memory and may be accessed using any suitable technique. In one implementation, the data in the table, such as the power request information for table 501, may be stored in an array using an index that is calculated by subtracting 6500 from the measured resistance across the "A" pairs of wired (rounded to the nearest 500Ω) and then dividing by 500. This generates an index value of 0 for 6.5 kΩ, 10 for 11.5 kΩ, and 49 for 31.0 kΩ, which can be used to access the data structure and obtain the appropriate power request. Thus, the processor 339 of the PSE 110 shown in FIG. 3A/3B may be programmed to calculate an offset into a data structure stored in the memory 337 holding the set of power requests 338 based on the first measured resistance value to determine which power request of the set of power requests 338 to retrieve from the data structure as the device power request.

In another implementation, the data structure may include a resistance value associated with each power request in the data structure and the measures resistance may be compared to the stored resistance values to determine which power request to select. Thus, the processor 339 of the PSE 110 shown in FIG. 3A/3B may be programmed to compare the first measured resistance value to a set of resistance values to determine which power request of the set of power requests to retrieve from the data structure as the device power request. The set of resistance values may be stored in a data structure in memory 337 holding both the set of power requests 338 and the set of resistance values respectively associated with the set of power requests 338.

FIG. 5A shows table 501 of signature resistance values between the "A" pairs of wires 242A, 243A on the Ethernet cable, such as signature resistor 226A in FIG. 2A, as one example of how a signature resistance value for the "A" pairs of wires may be interpreted. Other sets of resistance value/range interpretations may be used for other implementations. The first column shows the target "A" pairs signature resistor value (with a 0.1% tolerance resistor value to be used in parentheses if no resistor with the exact target value is commonly available). The second column shows the type of drive requested for that target signature resistor value when used on the "A" pairs of wires 242A, 243A. The third column describes alternative configurations that may be supported for a measured signature resistance having that value as well as any other comments. Certain signature resistor values are used to indicate that a CV drive is requested for the PD. Specifically, 11.5 kΩ is to be used in LED fixture PDs that utilize a 24V DC CV driver, 9.5 kΩ is to be used in LED fixture PDs that utilize a 36V DC CV driver, and 8.5 kΩ is to be used in LED fixture PDs that utilize a 48V DC CV driver.

It is common for an LED fixture to use a CC drive of 300 mA, 400 mA, or 500 mA, although other CC drive levels may be used for other LED fixtures. Table 501 uses resistance values that allow for one to four 300 mA fixtures, one or two 400 mA fixtures, or one or two 500 mA fixtures to be driven from the same connection when connected in parallel. A 300 mA LED fixture PD can include a signature resistor on the "A" pairs of 30.9 kΩ which when measured as being in the 31 kΩ+400 Ω range (for values over 30 kΩ) informs the PSE that a 300 mA CC drive should be used for this LED fixture PD. If two of those fixtures are attached in parallel to the PSE, the effective signature resistance would be cut in half, which falls into the 15.5 kΩ+200Ω range (for values under 16 kΩ) which represents a request for a 600 mA CC drive, matching the needs for the two 300 mA fixtures. A worst case may drop the measured resistance in this example a little below the 15.5 kΩ+200 Ω range so in some implementations, a measured signature resistance of 15.0 kΩ may also be used to signify a 600 mA CC drive, but a Light fixture PD requesting a 600 mA CC drive should still use a 15.4 kΩ resistor. If three of those fixtures are attached in parallel to the PSE, the effective signature resistance would be cut to one third, or 10.3 kΩ. Since this falls between two 500 Ω values, both the 10.0 kΩ and 10.5 kΩ signature resistance measurements are assigned to represent a request for a 900 mA CC drive, which can drive all three of the attached 300 mA fixtures. And if four of those fixtures are attached in parallel to the PSE, the effective signature resistance would be cut to one fourth, or 7.725 kΩ (±1%). Since this also falls between two 500Ω values, both the 7.5 kΩ and 8.0 kΩ signature resistance measurements are assigned to represent a request for a 1200 mA CC drive, which can drive all four of the attached 300 mA fixtures.

Similarly, a 14.0 kΩ signature resistor represents a request for a 500 mA CC drive and a 7.0 kΩ signature resistance value represents are request for a 1000 mA CC drive which is able to drive two 500 mA CC fixtures in parallel. And a 13.0 kΩ signature resistor represents a request for a 400 mA CC drive and a 6.5 kΩ signature resistance value represents are request for a 800 mA CC drive which is able to drive two 400 mA CC fixtures in parallel. In addition, a 12.4 kΩ signature resistance value may be used to represent a fixture that does not fit the description of any of the defined drives and may require manual configuration under software control using a mechanism such as a serial communication link between the PD and the PSE over one or more of the conductors of the cable. In some implementations, a PSE may default to 100 mA CC drive for a manually configurable PD until otherwise configured. In other implementations, a PSE may default to disabling a manually configurable PD until otherwise configured.

If an installer would add more lights on a string than the output can handle (example: 3×500 mA Lights resulting in a resistor reading of 4.67 kΩ) the resistor value would fall below the 6 kΩ threshold when measured by the PSE, resulting in an error that can be communicated to the installer through a dedicated commissioning app.

Another benefit of the strategic mapping of values of first signature resistors in parallel is fault tolerance. If 3×300 mA lights are connected in parallel, allowing a 900 mA output, a wire defect or connection issue could easily damage the LED if 900 mA is directed to only one or two of the LED lights. Due to realtime reading of the signature resistor by the PSE, it would be able to react quickly and decrease the power to a new resistor value to protect the LED. An event like this could also alert the building facility manager of the possible failure.

The signature mapping of the first signature resistances (resistance across the "A" pairs) also allows specific types of definitions between the reserved values for Constant Voltage loads and manual setting where the output defaults to 100 mA (minimum current) to allow specific drive currents to be set in software that don't fall within the defined values (575 mA as an example).

In the example shown in FIG. 5A, a first signature resistance in one or more ranges may be interpreted to mean that the device connected to that Ethernet cable is not an LED load, but an input device. Any type of sensor may be used in the PD to generate different second resistance values which can be interpreted in any appropriate manner to provide an input to the X-PoE system. As one non-limiting example, if the PD has a first signature resistance of 11 kΩ, the second signature resistance (across the "B" wires) may be interpreted to be a Boolean sensor input. For example, the PD could include a single-pole-single-throw (SPST) switch across the "B" pair of wires so that a very low resistance is interpreted as a "0" input (i.e., "off" or false) and a very high resistance is interpreted as a "1" input (i.e., "on" or true). As another example, if the PD has a first signature resistance of 12 kΩ, the second signature resistance (across the "B" wires) may be interpreted to be a continuous sensor input, such as a potentiometer or a light sensor. In some implementations, a first signature resistance may indicate both a particular drive type and level (e.g., 500 mA CC) and that the second signature resistance should be interpreted as an input sensor, such as a Boolean input to control the on/off state of that PD. Note that the information corresponding to a first signature resistance value may be referred to as a power request even if it does not designate that any power is delivered and only designates that the PD is to be used as an input sensor device.

In at least one implementation of the PSE 110 shown in FIG. 3A/3B where loads may be connected to the PSE 110 in parallel, power requests in the set of power requests 338 respectively correspond to resistance ranges in a first set of resistance ranges. The set of power requests 338 include a first power request of a current regulated drive at Y mA corresponding to a first resistance range including a resistance of R kΩ, a second power request of a current regulated drive at 2×Y mA corresponding to a second resistance range including a resistance of R/2 kΩ, and a third power request of a current regulated drive at 3×Y mA corresponding to a third resistance range including a resistance of R/3 kΩ. Thus, the set of power requests 338 may include a first power request of a current regulated drive at Y mA corresponding to a first resistance range including a resistance of R kΩ and a second power request of a current regulated drive at M×Y mA corresponding to a second resistance range including a resistance of R/M kΩ, wherein M is an integer value. Alternatively or additionally, the set of power requests 338 may include a third power request of a voltage regulated drive at X Volts corresponding to a third resistance range including a resistance of R kΩ, and a fourth power request of a voltage regulated drive at X Volts corresponding to a fourth resistance range including a resistance of R/M kΩ, wherein M is an integer value.

In another implementation of the PSE 110 shown in FIG. 3A/3B where loads may be connected to the PSE 110 in series, the set of power requests 338 may include a fifth power request of a current regulated drive at Y mA corresponding to a fifth resistance range including a resistance of R kΩ, and a sixth power request of a current regulated drive at Y mA corresponding to a sixth resistance range including a resistance of R×M kΩ, wherein M is an integer value. Alternatively or additionally, the set of power requests 338 may include a seventh power request of a voltage regulated drive at X Volts corresponding to a seventh resistance range including a resistance of R kΩ, and an eighth power request of a voltage regulated drive at M×X Volts corresponding to a eighth resistance range including a resistance of R×M kΩ, wherein M is an integer value. Some implementations may include subsets of power requests supporting both parallel loads and serial loads.

FIG. 5B shows table 502 of signature resistance values for the "B" pairs of wires 242B, 243B on the Ethernet cable, such as signature resistor 226B in FIG. 2A, as one example of how a signature resistance value for the "B" pairs of wires may be interpreted. Other sets of resistance value/range interpretations may be used for other implementations. Note that a single table 502 is shown in FIG. 5B, but different tables could be defined for different first signature resistance values. Thus, table 502 could apply for PDs with a first signature resistance specifying a CC drive, a second table could apply for PDs with a first signature resistance specifying a CV drive, and a unique interpretation of the second signature resistance provided for each first resistance value specifying that it is an input device.

Similarly to the signature resistor values for the "A" pairs shown in FIG. 5A, the same assumptions may be used so resistance values between 6 kΩ to 35 kΩ may be used with a gap of 16 kΩ to 30.5 kΩ left to avoid conflict with IEEE PoE. The first column shows the target "B" pairs signature resistor value (with a 0.1% tolerance resistor value to be used in parentheses if no resistor with the exact target value is commonly available). The second column shows the user interface elements that would typically be associated with the PD using that signature resistor for the "B" pairs. The third column described the type of light fixture PD that may use that signature resistor for the "B" pairs. In table 502, resistance values that are not listed may be considered reserved for future use.

If no "B" signature resistor is included in a PD, the PSE may use a default as to how to power the PD. In at least one implementation, the PSE, upon detecting a B resistance value >35 kΩ, may assume that the PD only receives power on the "A" pairs and that there is no connection to the "B" pairs in the PD. Other implementations may have a different default behavior for a B resistance value >35 kΩ.

The second signature resistor is intended as light/load type identifier and is independent from the drive currents. The second signature resistor can define if a light has 1 or 2 dimming channels, if it allows tunable white (adjustable color temperatures), emergency light (should always be on in case of an emergency or power interruption) etc. The second signature resistor also has reserved definitions for future support which may be defined in the future as new applications arise.

Most light fixture PDs that receive power from both the "A" pairs and the "B" pairs, will likely have one of 3 different configurations. They may use power from both A and "B" pairs to drive a single aggregated load, they may use the power to drive two separate independent sets of LEDs, or they may use the power from the two sources to drive a tunable correlated color temperature (CCT) load, using one channel to drive a set of cool white LEDs (e.g. 5000K bluish LEDs) and the other channel to drive a set of warm white LEDs (e.g. 2700K orangish LEDs) to adjust the color temperature of the light output.

A PD can use a second signature resistor connected to the "B" pairs having a value of 6.98 kΩ to indicate that there are two separate LED loads being driven and that each load itself requests a drive as indicated by the first signature resistor connected to the "A" pairs. A user interface for controlling those two sets of LEDs should use separate controls, such as two independent sliders to control the loads unless they are grouped with other loads in the software.

A PD that has a single aggregated set of LEDs to drive using power from both the "A" pairs and the "B" pairs together can indicate such by connecting a second signature resistor to the "B" pairs having a value of 7.96 kΩ to indicate that there is a single set of LEDs being driven with a drive characteristic determined by the first signature resistor connected to the "A" pairs. A user interface for controlling the single sets of LEDs may provide an independent control for the set of LEDs powered by the PD unless it is grouped with other loads in the software.

Tunable CCT white LED fixtures may connect a second signature resistor to the "B" pairs having a value of 8.98 kΩ to indicate that the two power channels will be used to drive a first set of cool white LEDs and a second set of warm white LEDs to allow the color temperature of the LED fixture to be controlled. The "A" pairs and the "B" pairs are both requested to provide a drive characteristic as indicated by the first signature resistor connected to the "A" pairs. A user interface for controlling the tunable CCT white LEDs may provide controls to allow for setting both a brightness and a color temperature, such as two sliders, one for brightness going from 0% to 100% and one for color temperature going from 2700K to 5000K for example.

In some implementations, it may not be allowed to attach multiple PDs in parallel if using a second signature resistor connected to the "B" pairs because the capability of doubling the drive current in response to halving the signature resistance really doesn't apply to the second signature resistor. In other implementations, however, a PSE may map a signature resistance on the B pair to a default configuration, such as two separate loads (as indicated by a 6.98 kΩ signature resistance on the B pair of each PD), an aggregated load (as indicated by a 7.96 kΩ signature resistance on the B pair of each PD), or a tunable CCT white load (as indicated by a 8.98 kΩ signature resistance on the B pair of each PD). In some cases the default of the PSE may be programmable by a user or detection of the "B" resistance below 6.0 kΩ may result in the setup software prompting the installer for the appropriate load type identifier. If the PSE has this capability, multiple PDs of the default type that have a 300 mA, 400 mA, or 500 mA drive can be connected in parallel to a single connector of the PSE and behave properly as discussed above by providing adequate power to each PD.

Some implementations may support other types of loads and such devices may be identified through the use of the second signature resistor connected to the B pair. Examples include the use of an 11.0 kΩ second signature resistor to indicate that the power from the "A" pairs should be provided as indicated by the first signature resistor on the "A" pairs and that a 48V CV power source should be provided on the "B" pairs. This 48V CV power source may not be dimmable but may be switched in some cases by the software, although the default condition should be "on". Another example is to use a 13.0 kΩ second signature resistor to indicate that the two power sources may be negotiated using a serial communication between the PSE and the PD. This may commonly be used with the 12.4 kΩ first signature resistor indicating manual configuration.

Other examples for a second signature resistor include a 12.0 kΩ value to indicate that a USB outlet is being powered (with a simple status icon as a UI element) and a 14.0 kΩ value to indicate that the "A" pairs will power an LED as indicated by the first signature resistor but the "B" pairs will power a ceiling fan and may use a variable voltage to control a speed of the fan. In another example, a second signature resistance of 15.0 kΩ may be used to indicate that a special high power mode may be requested where two power sources are isolated from each other but will be combined together in an aggregated load to allow each power source to deliver up to the full 60 Watts (W) possible under UL class two standards. In yet another example, a second signature resistor value of 31.0 kΩ can be used to indicate that the power provided on one or both channels is used for emergency lighting and should not be controlled in the UI.

In at least one implementation of the PSE 110 shown in FIG. 3A/3B, the processor 339 may be programmed to determine that the device is a dimmable light emitting device based on the device load type identifier. It may then receive a control input from the computer network 101, a remote control, a user input device, or through any other mechanism, and modulate the power signal to dim the dimmable light emitting device in response to the control input. Furthermore, the processor 339 may programmed to determine that the device includes a tunable correlated color temperature load based on the device load type identifier, provide a first power signal over the two pairs of "A" contacts 342A, 343A in the Ethernet connector 112 consistent with the device power request, and provide a second power signal over the two pairs of "B" contacts 342B, 343B in the Ethernet connector 112 consistent with the device power request. The processor 339 may then receive a control input and modulate the first power signal and/or the second power signal based on the control input to control a color temperature of the tunable correlated color temperature load.

The processor 339 of the PSE 110 shown in FIG. 3A/3B may be programmed to provide the power signal to either the two pairs of "A" contacts 342A, 343A alone or to both the two pairs of "A" contacts 342A, 343A and the two pairs of "B" contacts 342B, 343B based on the device load type identifier. It may alternatively or additionally be programmed to determine that a first power signal should be provided to the two pairs of "A" contacts 342A, 343A and a second power signal should be provided to the two pairs of "B" contacts 342B, 343B based on the device load type identifier. It may then be programmed to provide the first power signal over the two pairs of "A" contacts 342A, 343A in the Ethernet connector 112 consistent with the device power request and the device load type identifier and to provide the second power signal over the two pairs of "B" contacts 342B, 343B in the Ethernet connector 112 consistent with the device power request and the device load type identifier. The processor 339 may be programmed to receive a first control input for the first power signal and a second control input for the second power signal, control the first power signal based the first control input without impacting the second power signal, and control the second power signal based the second control input without impacting the first power signal.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
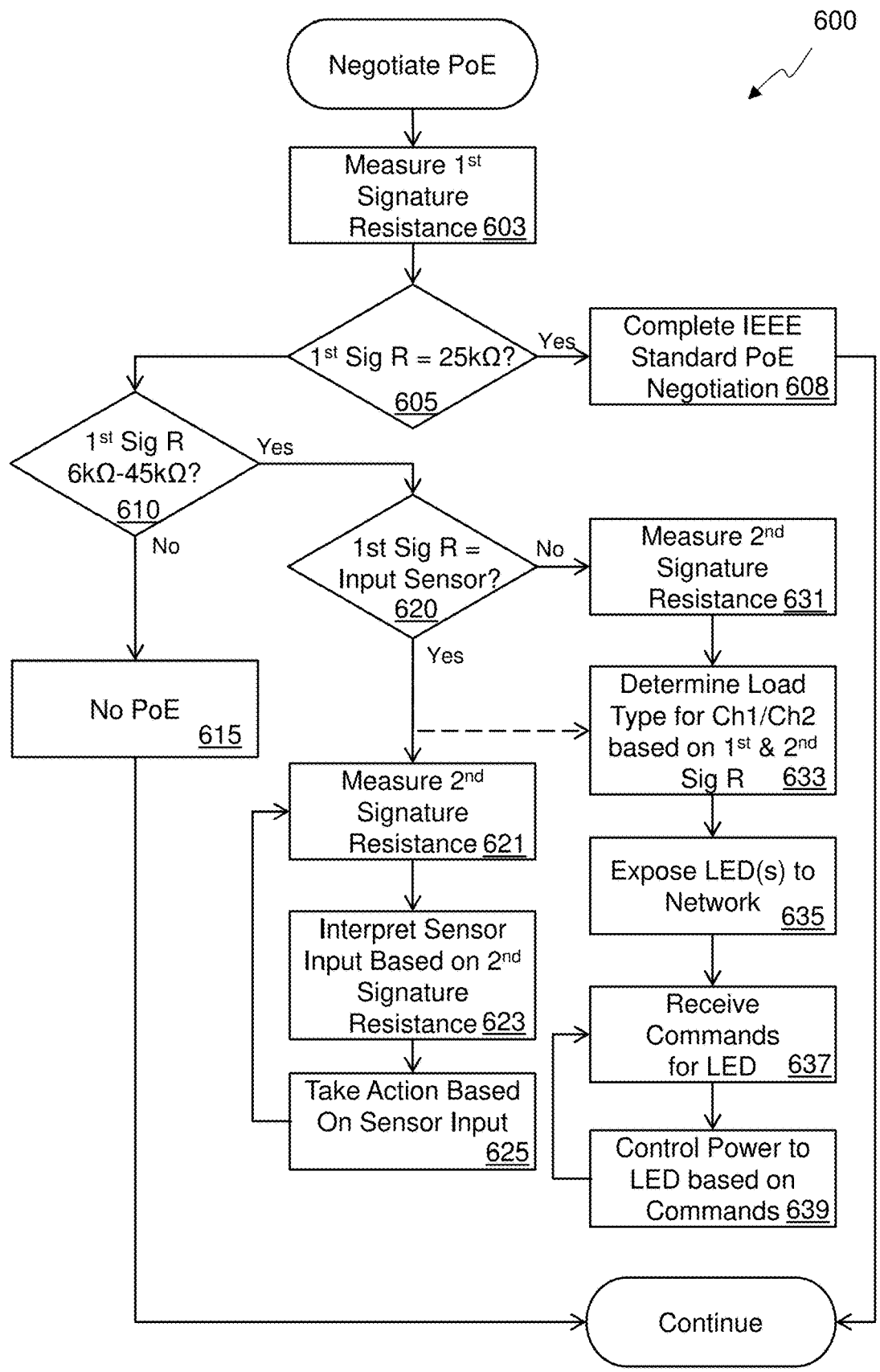
FIG. 6 is a flowchart of an example of negotiating for an LED fixture PD in a X-PoE system.

FIG. 6 is a flowchart 600 of an example of negotiating for an LED fixture PD in a X-PoE system. The method of the flowchart 600 may be used in a device which may also provide Ethernet switching or routing, may be compliant with an IEEE PoE standard, and/or may act as a standalone device to provide power over data cables to one or more devices.

The flowchart 600 begins by measuring 603 a resistance on the "A" pairs of wires in an Ethernet cable to another device, which may be referred to as a powered device (PD) herein, to determine a first signature resistance. This The PD may be compliant with an IEEE PoE specification or it may be consistent with X-PoE as disclosed herein. The PD can implement any type of functionality, but it may include one or more LEDs or may be coupled to one or more LEDs in some implementations. The resistance on the "A" pairs may be measured by providing a detection voltage across the "A" pairs of the cable. The detection voltage can be any voltage level, but in at least some embodiments, the detection voltage may be between about 2.7 V and about 10.1 V. In at least one embodiment, a 5V detection voltage may be used.

Once the detection voltage has been provided, a current provided to the PD may be measured to calculate the first signature resistance. In some implementations, the signature resistance may be directly calculated as the voltage divided by the current, but in other cases, two different measurements may be made to determine the slope of the voltage/current waveform with the slope being used to measure the first signature resistance more accurately. The value of the first signature resistance may be useful in determining whether the PD is compliant with an IEEE PoE standard, compliant with the present disclosure, or whether the PD is not configured to accept power over the data cable. In some implementations, the first signature resistance is checked 605 to see if the PD is compliant with an IEEE PoE standard, which defines a nominal resistance of 25 k$\Omega$ to indicate compliance with the IEEE PoE standard. In some embodiments, if the first signature resistance is found to be in a range the includes 25 k$\Omega$, such as between 19 k$\Omega$ and 26.5 k$\Omega$, the PD is determined to be compliant with an IEEE PoE standard and a PoE negotiation as defined by the appropriate IEEE PoE standard (e.g. 802.3af, 802.3at, or 802.3bt) may be performed 608 to determine the appropriate power to apply to the cable.

The first signature resistance, if not in the 19 kΩ-26.5 kΩ, is checked 610 to see if it is in the range defined by X-PoE, such as 6 kΩ-35 kΩ, If not, then the PD is not compliant with either IEEE PoE or X-PoE as described herein, so no power over Ethernet is provided 615 to the PD.

In some implementations, a first signature resistor value (or range) may be used to indicate that the PD is actually an input sensor. In the example shown, which is consistent with the example table 501 provided in FIG. 5A, a first signature resistor value of 11 kΩ may be used to indicate that the resistance measured on for the second signature resistor value should be interpreted as a sensor input. So the first signature resistance is checked 620 to see if it corresponds to a resistance range that designates the PD as being an input sensor, such as 11 kΩ in table 501. If first signature resistance corresponds to a resistance range that designates the PD as being an input sensor, the second signature resistance is measured 621. The measurement may be performed similarly to the measurement of the resistance on the "A" pairs of wires to determine a second signature resistance of the "B" pairs. Note that some power requests may indicate a drive type and level as well as indicate that the second resistance value is used for an input sensor and the flowchart 600 may execute both the branch starting with block 621 and the block starting with 633.

The second signature resistance may then be interpreted 623 to determine what type of input is being provided. In one non-limiting example, a second signature resistance value of greater than 35 kΩ is interpreted as an "on" value while a resistance value of less than 6 kΩ is interpreted as an "off" value. Other implementations may use other resistance values to indicate two binary values, such as "on" and "off." In some implementations, the second resistance value may be quantized into multiple ranges, such as 500 Ω ranges between 6 kΩ and 16 kΩ and/or 1 kΩ ranges between 31 kΩ and 35 kΩ to indicate specific input data such as different preset colors (or CCT) for a light or program presets for a lighting control program. Other implementations may use a range of resistances, such as from 6 kΩ and 16 kΩ to provide an analog input such as a brightness level or a temperature setting for a thermostat. Any combination of resistance ranges mapping to predetermined values and/or resistance ranges mapping to a range of values may be used by various implementations. Implementations may avoid the use of resistance values in a range of 19 kΩ-26.5 kΩ for the second signature resistance to ensure that it is not interpreted as being IEEE PoE compliant.

Once the second signature resistance has been interpreted 623 as sensor input, action is taken 625 based on the sensor input. The action 625 may be to control another output of the X-PoE system, such as to turn that output on or off or to modulate its output(s) based on a brightness or CCT input. In other implementations, the action 625 could be to provide the sensor input over a computer network to another device. Any type of action 625 may be taken, based on the sensor input, depending on the implementation.

In implementations, the second signature resistance may be periodically re-measured 621 and interpreted 623 as new sensor input. New action 625 may then be taken based on the new sensor input. This may be repeated at any appropriate interval, depending on the implementation.

If the first signature resistance is interpreted as an X-PoE power request with a drive type and value (e.g., one of the ranges defined in FIG. 5A other than the "Input Device" or "IEEE PoE" ranges for the example shown), a resistance on the "B" pairs of wires in the Ethernet cable may be measured 631. The measurement may be performed similarly to the measurement of the resistance on the "A" pairs of wires to determine a second signature resistance of the "B" pairs. The first signature resistance and the second signature resistance can then be used to determine 633 a load type and power request for one or both of the "A" pairs and/or the "B" pairs on the cable. An example of how the first and second signature resistances can be used to determine the load type and power requests is shown in the tables of FIG. 5A and FIG. 5B.

Once the information about the PD (which may be an LED device in some embodiments) has been received, the existence of the PD may be exposed 635 on a computer network. The PD may, in some embodiments, be exposed using a standard discovery protocol to allow it to be discovered and controlled by a variety of other devices. In other embodiments, the PD may be exposed to a proprietary application to allow that application to control the PD.

After the PD (which may be an LED driver in some embodiments) has been exposed, commands to control the PD may be received 637. In response to receiving the commands, the PD may be controlled 639 based on the received commands. In some cases, the received command may indicate a brightness level for an LED driver functioning as the PD. In some embodiments where the PD is an LED driver, the information determined 633 from the signature resistances may indicate that the LED driver utilizes a constant-current (CC) drive. In response, the PSE may calculate an appropriate amount of current for the brightness based on a maximum current level for the LED driver or a brightness vs current relationship for the LED driver, and the calculated amount of current may be provided through the cable to the PD to set the desired brightness of the LED(s). The amount of current may be based on a brightness level indicated by the received command along with information indicating a full-brightness current level for the LED(s) received from the PD. So as a non-limiting example, if information indicating the a current of 500 mA would provide full brightness, and a command indicating that the LED(s) should be turned on at 50% brightness, a 250 mA signal may be provided to the LED driver though the cable. In some embodiments, the amount of current may be found using brightness vs current information which may be in the form of an equation (linear, polynomial, or other) or a table of values (which may have a complete set current values for each possible brightness level or current values for only some brightness levels which can then be interpolated).

In other embodiments where the PD is an LED driver, the information determined 633 may indicate that the LED driver utilizes a constant-voltage (CV) drive and/or may indicate a voltage level to use. In response, the PSE may calculate a percentage of on time to use to provide the desired brightness level for the LED(s). In some cases a linear relationship between a brightness level as a percentage of full brightness and the on time percentage may be used but in other cases, a non-linear relationship may be used which may be pre-determined by the PSE or may be based on information received from the LED driver. The PSE may then use the percentage of on time to generate the power signal using pulse-width modulation or pulse-density modulation and provide the power signal to the LED driver over the cable. As a non-limiting example, the LED driver may indicate that it is a CV driver and expects a 48V DC drive level. If a command is received indicating that the LED(s) should be turned on at a 50% brightness, a power signal with an amplitude of 48V and a 50% duty cycle at a given frequency, such as 2000 Hz, may be provided to the LED driver through the cable.

Over time additional commands may be received 637 and the PD controlled 639 based on the received commands and the information received from the PD.

Figure 7:
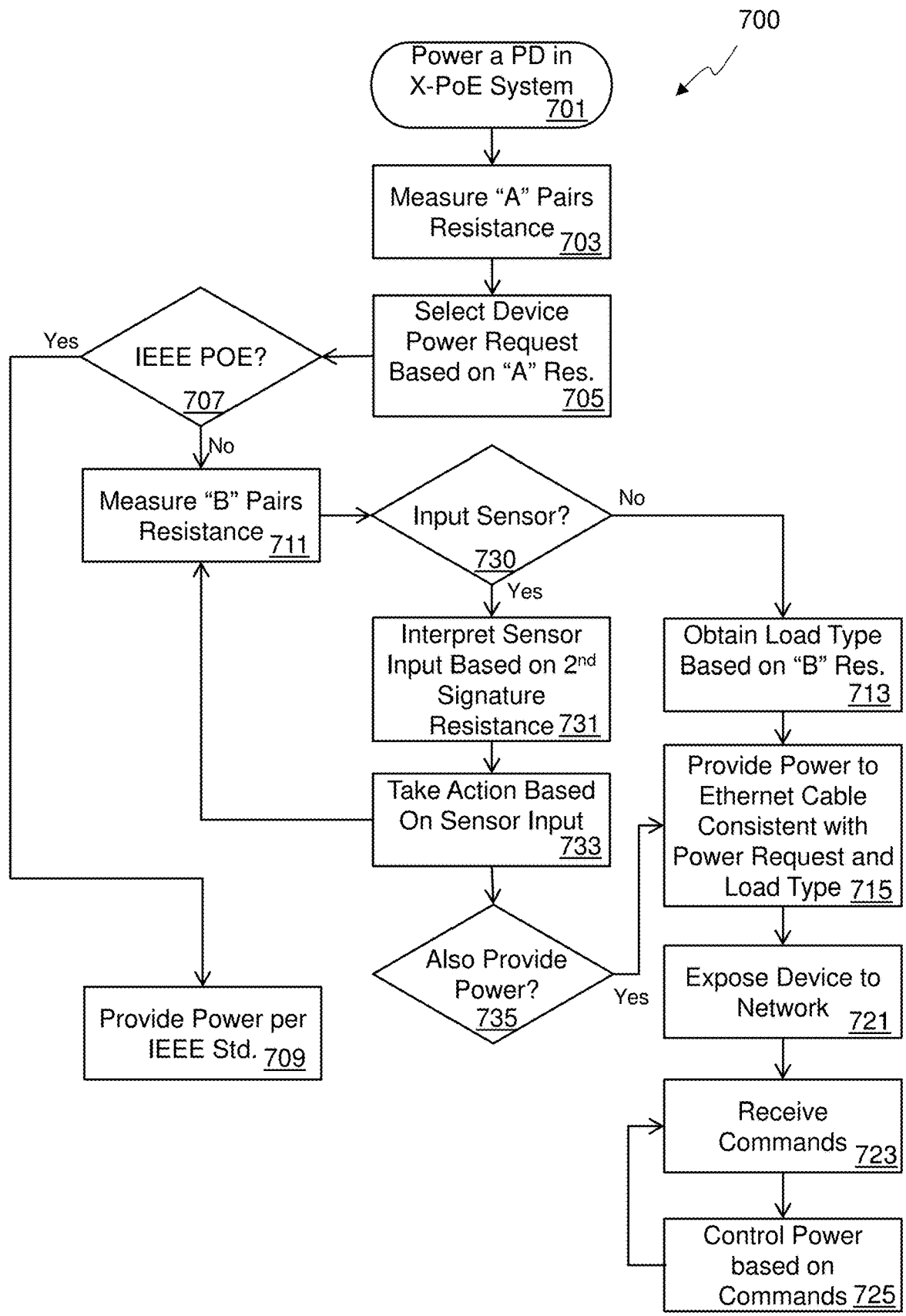
FIG. 7 is a flowchart of an alternative example of powering a PD in a X-PoE system.

FIG. 7 is a flowchart 700 of an alternative example of a method of powering 701 a PD in a X-PoE system. Power is provided to the device (i.e. the PD) over an Ethernet cable having two "A" pairs of wires and two "B" pairs of wires. The method obtains a first measured resistance value by measuring 703 of a resistance between the two "A" pairs of wires of the Ethernet cable. That is to measure the resistance between either pin 1 or pin 2 and either pin 3 or pin 6 of the Ethernet connector to which the Ethernet cable is connected.

A device power request for the device is then selected 705 from a set of power requests based on the first measured resistance value. Power requests in the set of power requests may respectively correspond to resistance ranges in a first set of resistance ranges. The selection 705 may be accomplished, at least in part, by calculating an offset into a data structure holding the set of power requests based on the first measured resistance value to determine which power request of the set of power requests to retrieve from the data structure as the device power request. Alternatively, the first measured resistance value may be compared to a first set of resistance values to determine which power request of the set of power requests to obtain as the device power request. In some implementations, a power signal is then provided to the Ethernet cable consistent with the device power request.

The set of power requests includes an IEEE power request and a plurality of other power requests, and the IEEE power request indicates that the power signal should be provided to the Ethernet cable in a manner compliant with a standard published by an IEEE 802.3 committee and is selected as the device power request in response to determining that the first measured resistance value is in a resistance range of 19-26.5 k$\Omega$. At least some of the plurality of other power requests in the set of power requests include a designation of a voltage regulated power signal (i.e., a constant voltage source) at a specified voltage value or a designation of a current regulated power signal (i.e., a constant current source) at a specified current value. That is to say at least some power requests of the set of power requests indicate a drive type and/or a drive value, wherein the drive type indicates a current regulated power signal or a voltage regulated power signal, and the drive value indicates a specified current value or a specified voltage value.

Some X-PoE systems may allow multiple devices to be connected in parallel to the Ethernet cable. The set of power requests in such systems may include a first power request that corresponds to a resistance range including a value of R1 k$\Omega$ and designates Y1 mA as the specified current value, a second power request that corresponds to a resistance range including a value of R1/2 k$\Omega$ and designates 2×Y1 mA as the specified current value, and a third power request that corresponds to a resistance range including a value of R1/3 k$\Omega$ and designates 3×Y1 mA as the specified current value. To put it more generally, the set of power requests may include a first power request that corresponds to a resistance range including a value of R2 k$\Omega$ and designates Y2 mA as the specified current value, and a second power request that corresponds to a resistance range including a value of R2/M k$\Omega$ and designates M×Y2 mA as the specified current value, wherein M is an integer greater than 1. Alternatively or in addition, in systems where multiple devices may be connected in parallel to the Ethernet cable, the set of power requests may include a third power request of a voltage regulated drive at X3 Volts corresponding to a third resistance range including a resistance of R3 k$\Omega$, and a fourth power request of a voltage regulated drive at X3 Volts corresponding to a fourth resistance range including a resistance of R3/M k$\Omega$, wherein M is an integer value.

Some X-PoE systems may allow multiple devices to be connected in series to the Ethernet cable. The set of power requests in such systems may include a fifth power request of a current regulated drive at Y4 mA corresponding to a fifth resistance range including a resistance of R4 k$\Omega$, and a sixth power request of a current regulated drive at Y4 mA corresponding to a sixth resistance range including a resistance of R4×M k$\Omega$, wherein M is an integer value. Alternatively or in addition, in systems where multiple devices may be connected in series to the Ethernet cable, the set of power requests may include a seventh power request of a voltage regulated drive at X5 Volts corresponding to a seventh resistance range including a resistance of R5 k$\Omega$, and an eighth power request of a voltage regulated drive at M×X5 Volts corresponding to a eighth resistance range including a resistance of 5R×M k$\Omega$, wherein M is an integer value.

The flowchart 700 also shows that if it is determined that the device power request is the IEEE power request 707 by deciding that the first measured resistance value is in a resistance range of 19-26.5 k$\Omega$, the power signal is provided 709 to the Ethernet cable in a manner compliant with a standard published by an IEEE 802.3 committee.

In some implementations, the flowchart 700 continues with measuring 711 a resistance between the two "B" pairs of wires in the Ethernet cable. That is to measure the resistance between either pin 4 or pin 5 and either pin 7 or pin 8 of the Ethernet connector to which the Ethernet cable is connected. The way that the second measured resistance value is used may vary depending on the implementation. In implementations where none of the power requests designate an input sensor, the flowchart continues with block 713 as described below.

In implementations that include at least one power request that designates that the PD may be used as an input sensor, it is determined 730 whether the selected device power request designates an input sensor. If it does not, a device load type identifier is then obtained 713 based on the second measured resistance value and the power signal is provided 715 to the Ethernet cable consistent with both the device power request and the device load type identifier. The device load type identifier can be obtained by any appropriate method, but in some implementations, an offset into a data structure holding a set of load type identifiers may be calculated based on the second measured resistance value to determine which load identifier of the set of load type identifiers to obtain from the data structure as the device load type identifier. In other implementations, the second measured resistance value may be compared to a second set of resistance values to determine which load type identifier to obtain from a data structure holding a set of load type identifiers as the device load type identifier.

The system may take different actions depending on the device load type identifier. In some implementations, the system may display a user interface element, selected based on the device load type identifier, on a user interface. This is indicated in the "UI Elements" column of FIG. 5B which shows different user interface element that may be displayed for different load type identifiers as indicated by different resistances across the "B" pairs of wires. As an example a resistance of 7 k$\Omega$ across the "B" pairs of wires may corresponds to a load type identifier that indicates there are two loads that are each dimmable light loads and two separate sliders may be displayed, one for the load connected to the "A" pairs of wires and a separate one for the load connected to the "B" pairs of wires. A resistance of 8 kΩ across the "B" pairs of wires may correspond to a load type identifier that indicates there is a single load that can draw power from both the "A" pairs of wires and the "B" pairs of wires. As another example, a resistance of 11 kΩ may be used to indicate that a slider should be displayed and used to control the load connected to the "A" pairs of wires while a simple switch displayed and used to control the load connected to the "B" pairs of wires. Different implementations may have a wide variety of user interface controls that correspond to different resistances across the "B" pairs of wires that can be used to control and/or show status of different loads.

In some implementations, the system may determine that the device is a dimmable light emitting device based on the device load type identifier (e.g., the load type identifier corresponding to a "B" resistance of 7 kΩ, 8 kΩ, 9 kΩ, 11 kΩ, 14 kΩ or 15 kΩ) and modulate the power signal to dim the dimmable light emitting device. The dimming may be done based on control inputs received by the system. The modulation of the power signal may include changing the steady state current level of a current regulated power signal, changing the steady state voltage level of a voltage regulated power signal, pulsing the power signal, and/or any other appropriate method of modulating the power signal. The device load type identifier may indicate that the device comprises a tunable correlated color temperature load (e.g. the load type identifier associated with a "B" resistance of 9 kΩ) and modulate both the first power signal and the second power signal to control a color temperature of the tunable correlated color temperature load.

The system may, in some implementations, provide the power signal to either the two "A" pairs of wires alone or to both the two "A" pairs of wires and the two "B" pairs of wires based on the device load type identifier. For example, based on the device load type identifier corresponding to a "B" resistance of 7 kΩ, a first power signal may be provided over two "A" pairs of wires in the Ethernet cable while a second power signal may be provided over two "B" pairs of wires in the Ethernet cable. The first power signal and the second power signal may then be independently controlled.

In some implementations, the method shown in flowchart 700 may include exposing 721 an existence of the device over a computer network. Any discovery protocol may be used to expose the device and its capabilities to other devices on the network as described earlier in this document. A command for the device may be received 723 over the computer network and the power signal controlled 725 based on the command. The command may include such things a turning a power signal on and off and/or a dimming command for a lighting device which may cause the power signal to be modulated. New commands may be received 723 causing different control 725 of the power signal over time.

In an implementation that includes at least one power request that designates that the PD may be used as an input sensor where it is determined 730 that the selected device power request designates an input sensor, The measured resistance across the "B" pairs of wires is interpreted 731 to determine what sensor input is being provided. This interpretation may be implementation specific, but may assign values to ranges or resistances. In some implementations, one range of resistances may be assigned to a "0" (or "off" or false) value and another range of resistances may be assigned to a "1" (or "on" or true) value. In some implementations, a range of resistances may be continuously evaluated (or finely quantized) to map to a range of values, such as a 0%-100% brightness value. Any appropriate mapping may be used between the measured resistance value and sensor inputs, depending on the implementation.

Once the measured resistance has been interpreted, action can be taken 733 based on the sensor input. In one example, a predetermined X-PoE PD may be turned "on" or "off" based on the resistance value. In another example, a predetermined X-PoE PD may be dimmed based on the resistance value. In another example, the resistance value may be interpreted as an environmental illuminance level and provided over a computer network for use by an automation system. In some cases, the power request may also designate that power is to be provided over the "A" pairs of wires while the "B" pairs of wires are used as a sensor input as determined in block 735. If so, then power is provided as shown in block 715 and the flowchart 700 continues. The method may also periodically measure 711 the "B" pair resistance and repeat the interpretation 731 and action 733 based on updated measured resistance values. This may occur concurrently with providing power 715 in some cases.

As will be appreciated by those of ordinary skill in the art, aspects of the various implementations may be embodied as a system, device, method, or computer program product apparatus. Accordingly, elements of the present disclosure may take the form of an entirely hardware implementation, an entirely software implementation (including firmware, resident software, micro-code, or the like), or an implementation combining software and hardware aspects that may all generally be referred to herein as an "apparatus," "circuit," "circuitry," "module," "computer," "logic," "FPGA," "unit," "system," or other terms. Furthermore, aspects of the various implementations may take the form of a computer program product embodied in one or more computer-readable medium(s) having computer program code stored thereon. The phrases "computer program code" and "instructions" both explicitly include configuration information for a Coarse-Grained Reconfigurable Architecture (CGRA), a Field-Programmable Gate-Array (FPGA), or other programmable logic, as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various implementations may be written in any combination of one or more programming languages, including object-oriented programming languages such as Java, Python, C++, or the like, conventional procedural programming languages, such as the "C" programming language or similar programming languages, low-level computer languages, such as assembly language or microcode, or hardware description languages such as VHDL or Verilog. The computer program code may use machine-learning libraries such as PyTorch or TensorFlow. The computer program code may be compiled or otherwise converted into machine-executable instructions, such as binary computer code for a traditional processing core or configuration files for a CGRA IC or FPGA. The machine-executable instructions, if loaded onto a computer, FPGA, CGRA IC, or other programmable apparatus, produces a computer-implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Examples of various implementations are described in the following clauses:

Clause 1. A method of providing power to a device over an Ethernet cable having two "A" pairs of wires and two "B" pairs of wires, the method comprising: obtaining a first measured resistance value by measuring a resistance between the two "A" pairs of wires of the Ethernet cable; selecting a device power request for the device from a set of power requests based on the first measured resistance value; and providing a power signal to the Ethernet cable consistent with the device power request; wherein the set of power requests includes an IEEE power request and a plurality of other power requests, and the IEEE power request indicates that the power signal should be provided to the Ethernet cable in a manner compliant with a standard published by an IEEE 802.3 committee and is selected as the device power request in response to determining that the first measured resistance value is in a resistance range of 19-26.5 k$\Omega$.

Clause 2. The method of clause 1, wherein the device power request includes a designation of a voltage regulated power signal at a specified voltage value.

Clause 3. The method of clause 1, wherein the device power request includes a designation of a current regulated power signal at a specified current value.

Clause 4. The method of clause 3, wherein the set of power requests includes: a first power request that corresponds to a resistance range including a value of R k$\Omega$ and designates Y mA as the specified current value; a second power request that corresponds to a resistance range including a value of R/2 k$\Omega$ and designates 2×Y mA as the specified current value; and a third power request that corresponds to a resistance range including a value of R/3 k$\Omega$ and designates 3×Y mA as the specified current value.

Clause 5. The method of clause 3, wherein the set of power requests includes: a first power request that corresponds to a resistance range including a value of R k$\Omega$ and designates Y mA as the specified current value; and a second power request that corresponds to a resistance range including a value of R/M k$\Omega$ and designates M×Y mA as the specified current value, wherein M is an integer greater than 1.

Clause 6. The method of any preceding clause, wherein at least some power requests of the set of power requests indicate a drive type and/or a drive value, wherein the drive type indicates a current regulated power signal or a voltage regulated power signal, and the drive value indicates a specified current value or a specified voltage value.

Clause 7. The method of any preceding clause, further comprising calculating an offset into a data structure holding the set of power requests based on the first measured resistance value to determine which power request of the set of power requests to retrieve from the data structure as the device power request.

Clause 8. The method of any of clauses 1 through 6, further comprising comparing the first measured resistance value to a first set of resistance values to determine which power request of the set of power requests to obtain as the device power request.

Clause 9. The method of any of clauses 1 or 6 through 8, wherein power requests in the set of power requests respectively correspond to resistance ranges in a first set of resistance ranges and the set of power requests include: a first power request of a current regulated drive at Y mA corresponding to a first resistance range including a resistance of R k$\Omega$; a second power request of a current regulated drive at 2×Y mA corresponding to a second resistance range including a resistance of R/2 k$\Omega$; and a third power request of a current regulated drive at 3×Y mA corresponding to a third resistance range including a resistance of R/3 k$\Omega$.

Clause 10. The method of any of clauses 1 or 6 through 8, wherein power requests in the set of power requests respectively correspond to resistance ranges in a first set of resistance ranges and the set of power requests include: a first power request of a current regulated drive at Y mA corresponding to a first resistance range including a resistance of R1 k$\Omega$; and a second power request of a current regulated drive at M×Y mA corresponding to a second resistance range including a resistance of R1/M kΩ, wherein M is an integer value.

Clause 11. The method of any of clauses 1, 6 through 8, or 10, wherein power requests in the set of power requests respectively correspond to resistance ranges in a first set of resistance ranges and the set of power requests include: a third power request of a voltage regulated drive at X Volts corresponding to a third resistance range including a resistance of R2 kΩ; and a fourth power request of a voltage regulated drive at X Volts corresponding to a fourth resistance range including a resistance of R2/M kΩ, wherein M is an integer value.

Clause 12. The method of any of clauses 1, 6 through 8, or 10 through 11, wherein power requests in the set of power requests respectively correspond to resistance ranges in a first set of resistance ranges and the set of power requests include: a fifth power request of a current regulated drive at Y mA corresponding to a fifth resistance range including a resistance of R3 kΩ; and a sixth power request of a current regulated drive at Y mA corresponding to a sixth resistance range including a resistance of R3×M kΩ, wherein M is an integer value.

Clause 13. The method of any of clauses 1, 6 through 8, or 10 through 12, wherein power requests in the set of power requests respectively correspond to resistance ranges in a first set of resistance ranges and the set of power requests include: a seventh power request of a voltage regulated drive at X Volts corresponding to a seventh resistance range including a resistance of R4 kΩ; and an eighth power request of a voltage regulated drive at M×X Volts corresponding to a eighth resistance range including a resistance of R4×M kΩ, wherein M is an integer value.

Clause 14. The method of any preceding clause, further comprising: obtaining a second measured resistance value by measuring a resistance between the two "B" pairs of wires in the Ethernet cable; obtaining a device load type identifier based on the second measured resistance value; and providing the power signal to the Ethernet cable consistent with both the device power request and the device load type identifier.

Clause 15. The method of clause 14, further comprising calculating an offset into a data structure holding a set of load type identifiers based on the second measured resistance value to determine which load identifier of the set of load type identifiers to obtain from the data structure as the device load type identifier.

Clause 16. The method of clause 14, further comprising comparing the second measured resistance value to a second set of resistance values to determine which load type identifier to obtain from a data structure holding a set of load type identifiers as the device load type identifier.

Clause 17. The method of any of clauses 14 through 16, further comprising: displaying a user interface element, selected based on the device load type identifier, on a user interface.

Clause 18. The method of any of clauses 14 through 17, the method further comprising: determining that the device is a dimmable light emitting device based on the device load type identifier; and modulating the power signal to dim the dimmable light emitting device.

Clause 19. The method of any of clauses 14 through 18, the method further comprising: providing the power signal to either the two "A" pairs of wires alone or to both the two "A" pairs of wires and the two "B" pairs of wires based on the device load type identifier.

Clause 20. The method of any of clauses 14 through 19, the method further comprising: determining, based on the device load type identifier, that separate power signals should be provided over the two "A" pairs of wires and the two "B" pairs of wires in the Ethernet cable; providing a first power signal over two "A" pairs of wires in the Ethernet cable; providing a second power signal over two "B" pairs of wires in the Ethernet cable; and independently controlling the first power signal and the second power signal.

Clause 21. The method of clause 20, the method further comprising: determining, based on device load type identifier, that the device comprises a tunable correlated color temperature load; and modulating the first power signal and the second power signal to control a color temperature of the tunable correlated color temperature load.

Clause 22. The method of any preceding clause, further comprising: exposing an existence of the device over a computer network; receiving a command for the device over the computer network; and controlling the power signal based on the command.

Clause 23. A method of providing power to a device over an Ethernet cable having two "A" pairs of wires and two "B" pairs of wires, the method comprising: obtaining a first measured resistance value by measuring of a resistance between the two "A" pairs of wires of the Ethernet cable; selecting a device power request for the device from a set of power requests based on the first measured resistance value; and providing a power signal to the Ethernet cable consistent with the device power request; wherein power requests in the set of power requests respectively correspond to resistance ranges and the set of power requests include a first power request, a second power request, and an IEEE power request, the first power request designates an electrical value of X that corresponds to a first resistance range that includes R kΩ; the second power request designates an electrical value of X×M that corresponds to a second resistance range that includes either R/M kΩ or R×M kΩ, wherein M is an integer value and the electrical value is either a voltage value or a current value, and the IEEE power request indicates that the power signal should be provided to the Ethernet cable in a manner compliant with a standard published by an IEEE 802.3 committee that corresponds to an IEEE resistance range subsuming a range of 19-26.5 kΩ.

Clause 24. The method of clause 23, wherein the first power request designates a current regulated drive at X mA; and the second power request designates a current regulated drive at X×M mA and the second resistance range including a resistance of R/M kΩ.

Clause 25. The method of clause 24 or 25, wherein the set of power requests further include: a third power request that designates a voltage regulated drive at Y Volts corresponding to a third resistance range including a resistance of S kΩ; and a fourth power request that designates a voltage regulated drive at Y Volts corresponding to a fourth resistance range including a resistance of S/M kΩ.

Clause 26. The method of clause 23, wherein the first power request designates a voltage regulated drive at X Volts; and the second power request designates a voltage regulated drive at X×M Volts and the second resistance range includes a resistance of R×M kΩ.

Clause 27. The method of clause 26, wherein the set of power requests further include: a third power request of a current regulated drive at Y mA corresponding to a third resistance range including a resistance of S kΩ; and a fourth power request of a current regulated drive at Y mA corresponding to a fourth resistance range including a resistance of S×M kΩ.

Clause 28. The method of any of clauses 23 through 27, further comprising: obtaining a second measured resistance value by measuring a resistance between the two "B" pairs of wires in the Ethernet cable; obtaining a device load type identifier based on the second measured resistance value; and providing the power signal to the Ethernet cable consistent with both the device power request and the device load type identifier.

Clause 29. The method of clause 28, further comprising: displaying a user interface element, selected based on the device load type identifier, on a user interface.

Clause 30. The method of clause 28 or 29, the method further comprising: determining that the device is a dimmable light emitting device based on the device load type identifier; and modulating the power signal to dim the dimmable light emitting device.

Clause 31. The method of any of clauses 28 through 30, the method further comprising: providing the power signal to either the two "A" pairs of wires alone or to both the two "A" pairs of wires and the two "B" pairs of wires based on the device load type identifier.

Clause 32. The method of any of clauses 28 through 30, the method further comprising: determining, based on the device load type identifier, that separate power signals should be provided over the two "A" pairs of wires and the two "B" pairs of wires in the Ethernet cable; providing a first power signal over two "A" pairs of wires in the Ethernet cable; providing a second power signal over two "B" pairs of wires in the Ethernet cable; and independently controlling the first power signal and the second power signal.

Clause 33. The method of clause 32, the method further comprising: determining, based on device load type identifier, that the device comprises a tunable correlated color temperature load; and modulating the first power signal and the second power signal to control a color temperature of the tunable correlated color temperature load.

Clause 34. The method of any of clauses 28 through 33, further comprising: exposing an existence of the device over a computer network; receiving a command for the device over the computer network; and controlling the power signal based on the command.

Clause 35. The method of any of clauses 23 through 27, wherein the first power request further designates an input sensor function, the method further comprising: obtaining a second measured resistance value by measuring of a resistance between the two "B" pairs of wires in the Ethernet cable; interpreting the second measured resistance value to determine an action; and performing the action.

Clause 36. The method of clause 35, wherein the interpreting comprises: determining which of two or more resistance ranges includes the second measured resistance value; and selecting the action from a table based on which of the two or more resistance ranges is determined to include the second measured resistance value.

Clause 37. The method of clause 35, wherein the interpreting comprises calculating a parameter for the action based on where the second measured resistance value lies in resistance range.

Clause 38. The method of any of clauses 35 through 37, wherein the action comprises controlling an on/off state of a lighting apparatus or controlling a dimming level of a lighting apparatus.

Clause 39. The method of clause 38, wherein the lighting apparatus is included in the device receiving the power signal over the Ethernet cable.

Clause 40. An apparatus for providing power to a device through an Ethernet connector, the apparatus comprising: an Ethernet connector having two pairs of "A" contacts and two pairs of "B" contacts; resistance measurement circuitry coupled to the Ethernet connector; power circuitry, coupled to the Ethernet connector, to generate a power signal at the Ethernet connector; a memory storing a set of power requests, wherein an IEEE power request in the set of power requests indicates that the power signal should be provided from the power circuitry to the Ethernet connector in a manner compliant with a standard published by an IEEE 802.3 committee; and a processor, coupled to the memory, the resistance measurement circuitry, and the power circuitry, the processor programmed to: obtain a first measured resistance value by measuring a resistance between the two pairs of "A" contacts of the Ethernet connector using the resistance measurement circuitry; retrieve a device power request for the device from the set of power requests stored in the memory based on the first measured resistance value, wherein the IEEE power request is to be selected in response to the first measured resistance value being in an IEEE range that includes 19 k$\Omega$ to 26.5 k$\Omega$; and provide the power signal from the power circuitry to the Ethernet connector consistent with the device power request.

Clause 41. The apparatus of clause 40, the processor further programmed to calculate an offset into a data structure stored in the memory holding the set of power requests based on the first measured resistance value to determine which power request of the set of power requests to retrieve from the data structure as the device power request.

Clause 42. The apparatus of clause 40, the memory further including a data structure stored in the memory containing both the set of power requests and a set of resistance values respectively associated with the set of power requests, the processor further programmed to compare the first measured resistance value to the set of resistance values to determine which power request of the set of power requests to retrieve from the data structure as the device power request.

Clause 43. The apparatus of any of clauses 40 through 42, wherein power requests in the set of power requests respectively correspond to resistance ranges in a first set of resistance ranges and the set of power requests include: a first power request of a current regulated drive at Y mA corresponding to a first resistance range including a resistance of R k$\Omega$; a second power request of a current regulated drive at 2×Y mA corresponding to a second resistance range including a resistance of R/2 k$\Omega$; and a third power request of a current regulated drive at 3×Y mA corresponding to a third resistance range including a resistance of R/3 k$\Omega$.

Clause 44. The apparatus of any of clauses 40 through 42, wherein power requests in the set of power requests respectively correspond to resistance ranges in a first set of resistance ranges and the set of power requests include: a first power request of a current regulated drive at Y mA corresponding to a first resistance range including a resistance of R1 k$\Omega$; and a second power request of a current regulated drive at M×Y mA corresponding to a second resistance range including a resistance of R1/M k$\Omega$, wherein M is an integer value.

Clause 45. The apparatus of any of clauses 40 through 42 or 44, wherein power requests in the set of power requests respectively correspond to resistance ranges in a first set of resistance ranges and the set of power requests include: a third power request of a voltage regulated drive at X Volts corresponding to a third resistance range including a resistance of R2 k$\Omega$; and a fourth power request of a voltage regulated drive at X Volts corresponding to a fourth resistance range including a resistance of R2/M k$\Omega$, wherein M is an integer value.

Clause 46. The apparatus of any of clauses 40 through 42 or 44 through 45, wherein power requests in the set of power requests respectively correspond to resistance ranges in a first set of resistance ranges and the set of power requests include: a fifth power request of a current regulated drive at Y mA corresponding to a fifth resistance range including a resistance of R3 kΩ; and a sixth power request of a current regulated drive at Y mA corresponding to a sixth resistance range including a resistance of R3×M kΩ, wherein M is an integer value.

Clause 47. The apparatus of any of clauses 40 through 42 or 44 through 47, wherein power requests in the set of power requests respectively correspond to resistance ranges in a first set of resistance ranges and the set of power requests include: a seventh power request of a voltage regulated drive at X Volts corresponding to a seventh resistance range including a resistance of R4 kΩ; and an eighth power request of a voltage regulated drive at M×X Volts corresponding to a eighth resistance range including a resistance of R4×M kΩ, wherein M is an integer value.

Clause 48. The apparatus of any of clauses 40 through 47, the memory further storing a set of load type identifiers wherein load type identifiers in the set of load type identifiers respectively correspond to resistance ranges in a second set of resistance ranges the processor further programmed to: obtain a second measured resistance value by measuring a resistance between the two pairs of "B" contacts of the Ethernet connector using the resistance measurement circuitry; retrieve a device load type identifier for the device from the set of load type identifiers stored in the memory based on the second measured resistance value; and provide the power signal from the power circuitry to the Ethernet connector consistent with both the device power request and the device load type identifier.

Clause 49. The apparatus of clause 48, the processor further programmed to: determine that the device is a dimmable light emitting device based on the device load type identifier; receive a control input; and modulate the power signal to dim the dimmable light emitting device in response to the control input.

Clause 50. The apparatus of clause 48 or 49, the processor further programmed to: provide the power signal to either the two pairs of "A" contacts alone or to both the two pairs of "A" contacts and the two pairs of "B" contacts based on the device load type identifier.

Clause 51. The apparatus of any of clauses 48 through 50, the processor further programmed to: determine that a first power signal should be provided to the two pairs of "A" contacts and a second power signal should be provided to the two pairs of "B" contacts based on the device load type identifier; provide the first power signal over the two pairs of "A" contacts in the Ethernet connector consistent with the device power request and the device load type identifier; provide the second power signal over the two pairs of "B" contacts in the Ethernet connector consistent with the device power request and the device load type identifier; receive a first control input for the first power signal and a second control input for the second power signal; control the first power signal based the first control input without impacting the second power signal; and control the second power signal based the second control input without impacting the first power signal.

Clause 52. The apparatus of any of clauses 48 through 51, the processor further programmed to: determine that the device comprises a tunable correlated color temperature load based on the device load type identifier; provide a first power signal over the two pairs of "A" contacts in the Ethernet connector consistent with the device power request; provide a second power signal over the two pairs of "B" contacts in the Ethernet connector consistent with the device power request; receive a control input; and modulate the first power signal and/or the second power signal based on the control input to control a color temperature of the tunable correlated color temperature load.

Clause 53. The apparatus of any of clauses 40 through 52, further comprising a computer network interface coupled to the processor, the processor further programmed to: expose an existence of the device over a computer network coupled to the computer network interface; receive a command for the device over the computer network; and control the power signal based on the command.

Clause 54. An apparatus for providing power to a device through an Ethernet connector, the apparatus comprising: an Ethernet connector having two pairs of "A" contacts and two pairs of "B" contacts; resistance measurement circuitry coupled to the Ethernet connector; power circuitry, coupled to the Ethernet connector, to generate a power signal at the Ethernet connector; a memory storing a set of power requests including a first power request, a second power request, and an IEEE power request; and a processor, coupled to the memory, the resistance measurement circuitry, and the power circuitry, the processor programmed to: obtain a first measured resistance value by measuring of a resistance between the two pairs of "A" contacts of the Ethernet connector using the resistance measurement circuitry; retrieve a device power request for the device from the set of power requests stored in the memory based on the first measured resistance value; and provide the power signal from the power circuitry to the Ethernet connector consistent with the device power request; wherein power requests in the set of power requests respectively correspond to resistance ranges, the first power request designates an electrical value of X that corresponds to a first resistance range that includes R kΩ; the second power request designates an electrical value of X×M that corresponds to a second resistance range that includes either R/M kΩ or R×M kΩ, wherein M is an integer value and the electrical value is either a voltage value or a current value, and the IEEE power request indicates that the power signal should be provided to the Ethernet connector in a manner compliant with a standard published by an IEEE 802.3 committee that corresponds to an IEEE resistance range subsuming a range of 19-26.5 kΩ.

Clause 55. The apparatus of clause 54, wherein the first power request designates a current regulated drive at X mA; and the second power request designates a current regulated drive at X×M mA and the second resistance range including a resistance of R/M kΩ.

Clause 56. The apparatus of clause 54 or 55, wherein the set of power requests further include: a third power request that designates a voltage regulated drive at Y Volts corresponding to a third resistance range including a resistance of S kΩ; and a fourth power request that designates a voltage regulated drive at Y Volts corresponding to a fourth resistance range including a resistance of S/M kΩ.

Clause 57. The apparatus of clause 54, wherein the first power request designates a voltage regulated drive at X Volts; and the second power request designates a voltage regulated drive at X×M Volts and the second resistance range includes a resistance of R×M kΩ.

Clause 58. The apparatus of clause 57, wherein the set of power requests further include: a third power request of a current regulated drive at Y mA corresponding to a third resistance range including a resistance of S kΩ; and a fourth power request of a current regulated drive at Y mA corresponding to a fourth resistance range including a resistance of S×M kΩ.

Clause 59. The apparatus of any of clauses 54 through 58, the memory further storing a set of load type identifiers wherein load type identifiers in the set of load type identifiers respectively correspond to resistance ranges in a second set of resistance ranges the processor further programmed to: obtain a second measured resistance value by measuring of a resistance between the two pairs of "B" contacts of the Ethernet connector using the resistance measurement circuitry; retrieve a device load type identifier for the device from the set of load type identifiers stored in the memory based on the second measured resistance value; and provide the power signal from the power circuitry to the Ethernet connector consistent with both the device power request and the device load type identifier.

Clause 60. The apparatus of clause 59, the processor further programmed to: determine that the device is a dimmable light emitting device based on the device load type identifier; receive a control input; and modulate the power signal to dim the dimmable light emitting device in response to the control input.

Clause 61. The apparatus of clause 59 or 60, the processor further programmed to: determine that a first power signal should be provided to the two pairs of "A" contacts and a second power signal should be provided to the two pairs of "B" contacts based on the device load type identifier; provide the first power signal over the two pairs of "A" contacts in the Ethernet connector consistent with the device power request and the device load type identifier; provide the second power signal over the two pairs of "B" contacts in the Ethernet connector consistent with the device power request and the device load type identifier; receive a first control input for the first power signal and a second control input for the second power signal; control the first power signal based the first control input without impacting the second power signal; and control the second power signal based the second control input without impacting the first power signal.

Clause 62. The apparatus of any of clauses 59 through 61, the processor further programmed to: determine that the device comprises a tunable correlated color temperature load based on the device load type identifier; provide a first power signal over the two pairs of "A" contacts in the Ethernet connector consistent with the device power request; provide a second power signal over the two pairs of "B" contacts in the Ethernet connector consistent with the device power request; receive a control input; and modulate the first power signal and/or the second power signal based on the control input to control a color temperature of the tunable correlated color temperature load.

Clause 63. The apparatus of any of clauses 54 through 58, wherein the first power request further designates an input sensor function, the processor further programmed to: obtain a second measured resistance value by measuring a resistance between the two pairs of "B" contacts in the Ethernet connector; interpret the second measured resistance value to determine an action; and perform the action.

Clause 64. The apparatus of clause 63, wherein the processor, to interpret the second measured resistance value to determine the action, is further programmed to: determine which of two or more resistance ranges includes the second measured resistance value; and select the action from a table stored in the memory based on which of the two or more resistance ranges is determined to include the second measured resistance value.

Clause 65. The apparatus of clause 63 or 64, wherein the processor, to interpret the second measured resistance value to determine the action, is further programmed to calculate a parameter for the action based on where the second measured resistance value lies in resistance range.

Clause 66. The apparatus of any of clauses 63 through 65, wherein the processor, to perform the action, is further programmed to control an on/off state or a dimming level of a lighting apparatus.

Clause 67. The apparatus of clause 66, wherein the lighting apparatus receives a power signal from the apparatus through the Ethernet connector.

Clause 68. A method of receiving sensor data over an Ethernet cable having two "A" pairs of wires and two "B" pairs of wires, the method comprising: obtaining a first measured resistance value by measuring a resistance between the two "A" pairs of wires of the Ethernet cable; selecting a device power request from a set of power requests based on the first measured resistance value, the device power request designating an input sensor function; obtaining a second measured resistance value by measuring a resistance between the two "B" pairs of wires in the Ethernet cable; interpreting the second measured resistance value to determine an action; and performing the action; wherein power requests in the set of power requests respectively correspond to resistance ranges and the set of power requests include a first power request, and an IEEE power request, the first power request designates the input sensor function and corresponds to a first resistance range that includes the first measured resistance value; and the IEEE power request indicates that a power signal should be provided to the Ethernet cable in a manner compliant with a standard published by an IEEE 802.3 committee and corresponds to an IEEE resistance range subsuming a range of 19-26.5 kΩ.

Clause 69. The method of clause 68, wherein the interpreting comprises: determining which of two or more resistance ranges includes the second measured resistance value; and selecting the action from a table based on which of the two or more resistance ranges is determined to include the second measured resistance value.

Clause 70. The method of clause 68 or 69, wherein the interpreting comprises calculating a parameter for the action based on where the second measured resistance value lies in resistance range.

Clause 71. The method of any of clauses 68 through 70, wherein the action comprises controlling an on/off state of a lighting apparatus or controlling a dimming level of a lighting apparatus.

Clause 72. The method of clause 71, further comprising providing a power signal to the lighting apparatus over the Ethernet cable.

Clause 73. The method of any of clauses 68 through 72, wherein the first power request further designates at least one electrical characteristic for a power signal, and the method further comprises: providing the power signal to the Ethernet cable consistent with the at least one electrical characteristic.

Clause 74. The method of clause 73, wherein the at least one electrical characteristic designates a current regulated drive at a predetermined current value.

Clause 75. The method of clause 73, wherein the at least one electrical characteristic designates a voltage regulated drive at a predetermined voltage value.

Clause 76. An apparatus for receiving sensor data through an Ethernet connector, the apparatus comprising: an Ethernet connector having two pairs of "A" contacts and two pairs of "B" contacts; resistance measurement circuitry coupled to the Ethernet connector; power circuitry, coupled to the Ethernet connector, to generate a power signal at the Ethernet connector; a memory storing a set of power requests including a first power request and an IEEE power request; and a processor, coupled to the memory, the resistance measurement circuitry, and the power circuitry, the processor programmed to: obtain a first measured resistance value by measuring of a resistance between the two pairs of "A" contacts of the Ethernet connector using the resistance measurement circuitry; retrieve a first device power request from the set of power requests stored in the memory based on the first measured resistance value; and obtain a second measured resistance value by measuring a resistance between the two pairs of "B" contacts in the Ethernet connector; interpret the second measured resistance value to determine an action; and performing the action; wherein power requests in the set of power requests respectively correspond to resistance ranges, the first power request designates an input sensor function and corresponds to a first resistance range that includes the first measured resistance value; and the IEEE power request indicates that a power signal should be provided to the Ethernet connector in a manner compliant with a standard published by an IEEE 802.3 committee and corresponds to an IEEE resistance range subsuming a range of 19-26.5 k$\Omega$.

Clause 77. The apparatus of clause 76, wherein the processor, to interpret the second measured resistance value to determine the action, is further programmed to: determine which of two or more resistance ranges includes the second measured resistance value; and select the action from a table stored in the memory based on which of the two or more resistance ranges is determined to include the second measured resistance value.

Clause 78. The apparatus of clause 76 or 77, wherein the processor, to interpret the second measured resistance value to determine the action, is further programmed to calculate a parameter for the action based on where the second measured resistance value lies in resistance range.

Clause 79. The apparatus of any of clauses 76 through 78, wherein the processor, to perform the action, is further programmed to control an on/off state or a dimming level of a lighting apparatus.

Clause 80. The apparatus of clause 79, wherein the lighting apparatus receives a power signal from the apparatus through the Ethernet connector.

Clause 81. The apparatus of any of clauses 76 through 80, wherein the first power request further designates at least one electrical characteristic for a power signal, and the apparatus is configured to provide the power signal to the Ethernet connector consistent with the at least one electrical characteristic.

Clause 82. The apparatus of clause 81, wherein the at least one electrical characteristic designates a current regulated drive at a predetermined current value.

Clause 83. The apparatus of clause 81, wherein the at least one electrical characteristic designates a voltage regulated drive at a predetermined voltage value.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, 3. $\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various implementations provided above is illustrative in nature and is not intended to limit this disclosure, its application, or uses. Thus, different variations beyond those described herein are intended to be within the scope of implementations. Such variations are not to be regarded as a departure from the intended scope of this disclosure. As such, the breadth and scope of the present disclosure should not be limited by the above-described exemplary implementations but should be defined only in accordance with the following claims and equivalents thereof.

We claim as follows:

We claim:

1. A method of providing power to a device over an Ethernet cable having two "A" pairs of wires and two "B" pairs of wires, the method comprising:
    obtaining a first measured resistance value by measuring of a resistance between the two "A" pairs of wires of the Ethernet cable;
    selecting a device power request for the device from a set of power requests based on the first measured resistance value, wherein the set of power requests include a first power request that corresponds to a first resistance value of R and designates a first requested current of X Amperes, and a second power request that corresponds to a second resistance value of R/M and designates a second requested current of X×M Amperes, wherein M is an integer value greater than 1 and both R and R/M are outside of a range of 19-26.5 k$\Omega$;
    obtaining a second measured resistance value by measuring a resistance between the two "B" pairs of wires in the Ethernet cable;
    obtaining a device load type identifier based on the second measured resistance value; and
    providing a power signal to the Ethernet cable consistent with both the device load type identifier and the device power request.

2. The method of claim 1, further comprising: displaying a user interface element, selected based on the device load type identifier, on a user interface.

3. The method of claim 1, the method further comprising: determining that the device is a dimmable light emitting device based on the device load type identifier; and
    modulating the power signal to dim the dimmable light emitting device.

4. The method of claim 1, further comprising:
    determining, based on the device load type identifier, that the device comprises a tunable correlated color temperature load and that separate power signals should be provided over the two "A" pairs of wires and the two "B" pairs of wires in the Ethernet cable;
    providing a first power signal over the two "A" pairs of wires in the Ethernet cable;
    providing a second power signal over the two "B" pairs of wires in the Ethernet cable; and
    modulating the first power signal and the second power signal to control a color temperature of the tunable correlated color temperature load.

5. The method of claim 1, further comprising: exposing an existence of the device over a computer network; receiving a command for the device over the computer network; and controlling the power signal based on the command.

6. The method of claim 1, wherein the first power request further designates an input sensor function, the method further comprising:
interpreting the second measured resistance value to determine an action; and
performing the action.

7. The method of claim 6, wherein the action comprises controlling an on/off state or a dimming level of a lighting apparatus.

8. An apparatus for providing power to a device through an Ethernet connector, the apparatus comprising:
an Ethernet connector having two pairs of "A" contacts and two pairs of "B" contacts;
resistance measurement circuitry coupled to the Ethernet connector;
power circuitry, coupled to the Ethernet connector, to generate a power signal at the Ethernet connector;
a memory storing a set of power requests and a set of load type identifiers, the set of power requests including a first power request that corresponds to a first resistance value of R and designates a first requested current of X Amperes, and a second power request that corresponds to a second resistance value of R/M and designates a second requested current of X×M Amperes, and load type identifiers in the set of load type identifiers respectively correspond to resistance ranges in a second set of resistance ranges, wherein M is an integer value greater than 1 and both R and R/M are outside of a range of 19-26.5 kΩ;
a processor, coupled to the memory, the resistance measurement circuitry, and the power circuitry, the processor programmed to:
obtain a first measured resistance value by measuring of a resistance between the two pairs of "A" contacts of the Ethernet connector using the resistance measurement circuitry;
retrieve a device power request for the device from the set of power requests stored in the memory based on the first measured resistance value;
obtain a second measured resistance value by measuring of a resistance between the two pairs of "B" contacts of the Ethernet connector using the resistance measurement circuitry;
retrieve a device load type identifier for the device from the set of load type identifiers stored in the memory based on the second measured resistance value; and
provide the power signal from the power circuitry to the Ethernet connector consistent with both the device load type identifier and the device power request.

9. The apparatus of claim 8, the processor further programmed to:
determine that the device is a dimmable light emitting device based on the device load type identifier;
receive a control input; and
modulate the power signal to dim the dimmable light emitting device in response to the control input.

10. The apparatus of claim 8, wherein the first power request further designates an input sensor function, the processor further programmed to:
interpret the second measured resistance value to determine an action; and
perform the action.

11. The apparatus of claim 8, the processor further programmed to:
determine, based on the device load type identifier, that the device comprises a tunable correlated color temperature load and that separate power signals should be provided over the two pairs of "A" contacts and the two pairs of "B" contacts in the Ethernet connector;
provide a first power signal to the two pairs of "A" contacts of the Ethernet connector;
provide a second power signal to the two pairs of "B" contacts of the Ethernet connector; and
modulate the first power signal and the second power signal to control a color temperature of the tunable correlated color temperature load.

12. The apparatus of claim 8, the processor further programmed to:
expose an existence of the device over a computer network;
receive a command for the device over the computer network; and
control the power signal based on the command.

13. An apparatus for providing power to a device through an Ethernet connector, the apparatus comprising:
an Ethernet connector having two pairs of "A" contacts and two pairs of "B" contacts;
resistance measurement circuitry coupled to the Ethernet connector;
power circuitry, coupled to the Ethernet connector, to generate a power signal at the Ethernet connector;
a memory storing a set of power requests and a set of load type identifiers, the set of power requests including a first power request that corresponds to a first resistance value of R and designates a first requested voltage of X Volts, and a second power request that corresponds to a second resistance value of R×M and designates a second requested voltage of X×M Volts, and load type identifiers in the set of load type identifiers respectively correspond to resistance ranges in a second set of resistance ranges, wherein M is an integer value greater than 1 and both R and R×M are outside of a range of 19-26.5 kΩ; and
a processor, coupled to the memory, the resistance measurement circuitry, and the power circuitry, the processor programmed to:
obtain a first measured resistance value by measuring of a resistance between the two pairs of "A" contacts of the Ethernet connector using the resistance measurement circuitry;
retrieve a device power request for the device from the set of power requests stored in the memory based on the first measured resistance value;
obtain a second measured resistance value by measuring of a resistance between the two pairs of "B" contacts of the Ethernet connector using the resistance measurement circuitry;
retrieve a device load type identifier for the device from the set of load type identifiers stored in the memory based on the second measured resistance value; and
provide the power signal from the power circuitry to the Ethernet connector consistent with both the device load type identifier and the device power request.

14. The apparatus of claim 13, the processor further programmed to:
determine, based on the device load type identifier, that the device comprises a tunable correlated color temperature load and that separate power signals should be provided over the two pairs of "A" contacts and the two pairs of "B" contacts in the Ethernet connector;

provide a first power signal to the two pairs of "A" contacts of the Ethernet connector;

provide a second power signal to the two pairs of "B" contacts of the Ethernet connector; and modulate the first power signal and the second power signal to control a color temperature of the tunable correlated color temperature load.

15. The apparatus of claim 13, the processor further programmed to:

expose an existence of the device over a computer network;

receive a command for the device over the computer network; and control the power signal based on the command.

16. The apparatus of claim 13, wherein the first power request further designates an input sensor function, the processor further programmed to:

interpret the second measured resistance value to determine an action; and perform the action.

17. The apparatus of claim 16, wherein the action comprises controlling an on/off state or a dimming level of a lighting apparatus.

18. The apparatus of claim 10, wherein the action comprises controlling an on/off state or a dimming level of a lighting apparatus.

* * * * *